(12) United States Patent
Galgon et al.

(10) Patent No.: US 8,518,257 B2
(45) Date of Patent: Aug. 27, 2013

(54) BIO-DENITRIFICATION APPARATUS AND METHOD FOR MAKING AND USING SAME

(75) Inventors: Randy A. Galgon, Nuremberg, PA (US); Allen Ray Stickney, Port Rowan (CA)

(73) Assignee: Kinder Morgan Operating L.P. "C", Houston, TX (US)

( * ) Notice: Subject to any disclaimer, the term of this patent is extended or adjusted under 35 U.S.C. 154(b) by 304 days.

(21) Appl. No.: 12/854,853

(22) Filed: Aug. 11, 2010

(65) Prior Publication Data
US 2011/0062080 A1    Mar. 17, 2011

Related U.S. Application Data

(60) Provisional application No. 61/232,850, filed on Aug. 11, 2009, provisional application No. 61/232,861, filed on Aug. 11, 2009, provisional application No. 61/352,724, filed on Jun. 8, 2010.

(51) Int. Cl.
*C02F 3/00* (2006.01)

(52) U.S. Cl.
USPC ..... 210/618; 210/189; 210/195.1; 210/195.3; 210/252

(58) Field of Classification Search
USPC .......... 210/610, 614–618, 189, 195.1, 195.3, 210/252
See application file for complete search history.

(56) References Cited

U.S. PATENT DOCUMENTS

| | | | |
|---|---|---|---|
| 6,077,432 A * | 6/2000 | Coppola et al. | 210/611 |
| 7,575,679 B2 * | 8/2009 | Sumino et al. | 210/252 |

* cited by examiner

*Primary Examiner* — Chester Barry
(74) *Attorney, Agent, or Firm* — Robert W. Strozier

(57) ABSTRACT

A denitrification system is disclosed, where a plurality of biological regenerated adsorptive cells or units. Each cell includes a counterflowing absorptive media and waste water to achieve a two or three zone biomass nitrate/nitrite degradation environment. The system includes a backwash water recirculation loop and a media recirculation loop, where the media recirculation loop subjects the media a sufficient shear to dislodge dead microbes and/or weakly bound microbial films from the media surface, but insufficient to substantially reduce the particle size of the friable media. Nutrient supply and distribution and gas controls are used regulate cell characteristics.

24 Claims, 16 Drawing Sheets

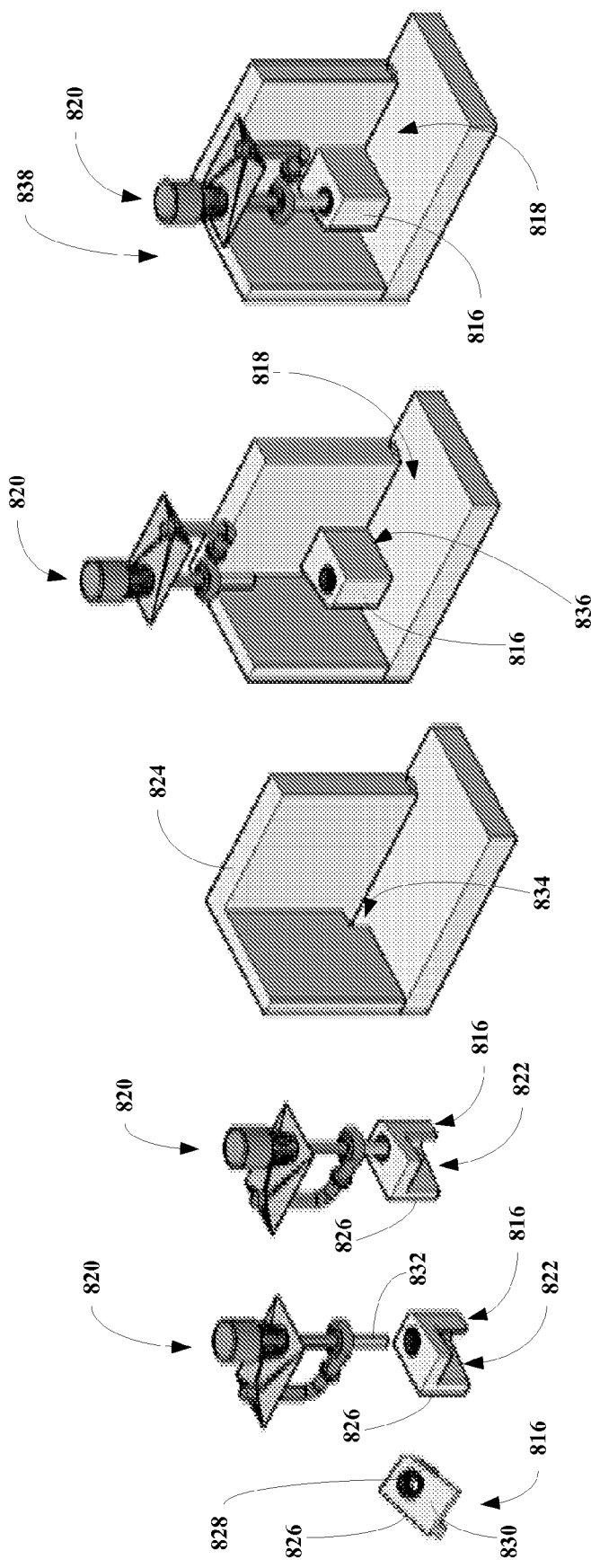

BIO-DENITRIFICATION APPARATUS AND METHOD FOR MAKING AND USING SAME

RELATED APPLICATIONS

This application claims the benefit of and priority to U.S. Provisional Application Nos. 61/232,850, filed 11 Aug. 2009 (Aug. 11, 2009 or 11 Aug. 2009), 61/232,861, filed 11 Aug. 2009 (Aug. 11, 2009 or 11 Aug. 2009) and 61/352,724, filed 8 Jun. 2010 (Jun. 8, 2010 or 8 Jun. 2010).

BACKGROUND OF THE INVENTION

1. Field of the Invention

Embodiments of the present invention relates to a bioreactor apparatus adapted to reduce a nitrogen content in an aqueous stream to a desired low level. The present invention also relates to a novel method and apparatus for near complete adsorption and conversion of nitrates from liquids adapted to the removal of nutrients from liquids by absorption.

More particularly, embodiments of the present invention relates to a bioreactor apparatus adapted to reduce a nitrogen content in an aqueous stream to a desired low level, where the apparatus includes a solid nitrogen absorbent, a aqueous bioactive solution, an inlet, an outlet, an aerobic section, an anaerobic section and an absorbent and solution circulation assembly. In certain embodiments, the apparatus of this invention can reduce a nitrogen content of the aqueous stream below about 10 ppm total nitrogen. In certain embodiments, the apparatus of this invention can reduce a nitrogen content of the aqueous stream below about 5 ppm total nitrogen. In certain embodiments, the apparatus of this invention can reduce a nitrogen content of the aqueous stream below about 1 ppm total nitrogen. In certain embodiments, the apparatus of this invention can reduce a nitrogen content of the aqueous stream below about 0.1 ppm total nitrogen.

2. Description of the Related Art

Bio-remediation has become an increasingly versatile part of remediation of waste materials. Bio-remediation can use used to help clean up oil spills, remove sulfur from compounds, remove nitrogen from compounds and other uses.

Current methods and apparatus used to effect the removal of nitrates are regenerative absorption columns, non-regenerative absorption columns, bioreactors, reverse osmosis, biofilters and traditional suspended denitrifying biological processes. For example, reverse osmosis systems are expensive, are subject to both biological and chemical fouling, use more energy than all other methods, and generate a high strength, usually toxic waste stream requiring expensive secondary treatment and or disposal.

Absorption columns use expensive media, require media replacement or regeneration, produce waste streams more toxic than the water to be treated, require periodic cleaning due to biological fouling and/or plugging by suspended solids, produce a second waste stream, include complicated piping and valves, are adversely affected by ions that compete with nitrogen and numerous compounds that poison the media.

Bioreactors and biofilters have narrow performance bands, are subject to biological fouling requiring parallel units or additional surge equipment for periodic cleaning, are limited to low nitrate concentrations that don't inhibit biological activity, cannot tolerate rapid concentration changes, require multiple days from startup until water can be treated, and are difficult to predict the length of time after startup to reach full performance.

Denitrifying biological processes require large areas, are effected by cold weather, are limited to low nitrate concentrations that do not inhibit biological activity, require large volumes to tolerate rapid concentration changes, require multiple days from startup until water can be treated, and are difficult to predict the length of time after startup to reach full performance.

Biological regeneration of absorption media has been commercially employed under patent (trade name is PACT), using activated carbon and continuous stirred tank reactors. The method and various apparatus employed are suspended biological processes using the activated carbon to absorb organic compounds and are not suited to nitrate removal. The method or apparatus used cannot completely regenerate the carbon without removal and use of external processing. It is typical of the commercial systems deployed to completely encase the activated carbon with biological growth rendering it inert and requiring constant replacement.

Although denitrification/bio-remediation apparatuses and methods have been introduced in the past, there is still a need in the art for a bio-denitrification apparatus capable of reducing a nitrogen content of an aqueous stream below a desired low level, where the low level is less than 10 ppm total nitrogen. In many embodiments of the present technology, the nitrogen level is less than or equal to about 3 ppm.

SUMMARY OF THE INVENTION

Embodiments of the present invention provides a denitrification system including at least one denitrification column, where the column or unit includes an inlet, an outlet, an optional aerobic zone, an anoxic zone, a clean water zone, a respiratory inhibition or inhibited zone, and a gas overhead zone. The unit also includes an ultra low pressure drop hydro cyclone, a water recirculation loop and a media recirculation loop. The unit also includes a nitrogen-rich, nutrient rich, and microbial rich raw water supply distributor adapted to produce an even or substantially even distribution (i.e., a uniform or substantially uniform distribution) of nitrogen-rich, nutrient rich, and microbial rich raw water across a cross-section of the column to improve nutrient utilization and reduce hot spots and channeling. The column is a counterflow column with water flowing up as it is being denitrified and absorptive media flowing down. The absorptive media is collected in at least one inducer, where collected media is mixed with recirculating water and lifted into the hydrocyclone. The water entering the inducer is sufficient to dislodge dead microbes and weakly bound microbial films from the media, but insufficient to reduce media particles size. Thus, the shear is carefully controlled to achieve media cleaning, while minimizing particle size reduction of the media. The inlet is adapted to receive an aqueous stream to be treated containing an unacceptable concentration of total nitrogen. The circulation assembly includes a solid nitrogen absorbent and a bioactive solution, where the assembly is adapted to circulate an absorbent slurry from a bottom of the respiratory inhibited zone to a top of the anoxic zone. The absorbent absorbs the nitrates and nitrites, while microorganisms in the bioactive solution convert the nitrates and nitrites into nitrogen gas in all of the zones of the column, except the gas overhead zone, while ammonia and other nitrogen-containing compounds are consumed by the microbes. The water in the slurry as it is being treated progresses from the stream inlet to the stream outlet.

Embodiments of the present invention overcome the above-named disadvantages of current nitrate removal processes by providing a compact and novel adsorption column, where adsorption, bio-desorption, mechanical-sloughing, solubilization, nitrogen degassing and solids separation increase the nitrate removal for a given fluid volume to be treated, such as a waste water pond or other volume of waste water—a waste water having a given nitrate contamination level. The ability to convert nitrates to nitrogen gas from fluids such as waste waters with influent concentrations more than 40 times greater than existing devices can handle and relatively immediate treatment on startup are embodied in the invention with integral continuous regeneration and endogenous decay, producing a non-hazardous waste stream.

BRIEF DESCRIPTION OF THE DRAWINGS

The invention can be better understood with reference to the following detailed description together with the appended illustrative drawings in which like elements are numbered the same:

FIGS. 8B-D depict 3D renderings of a safe path section featuring a momentum block and pump configuration for feeding the denitrification units.

DETAILED DESCRIPTION OF THE INVENTION

Figure 1:
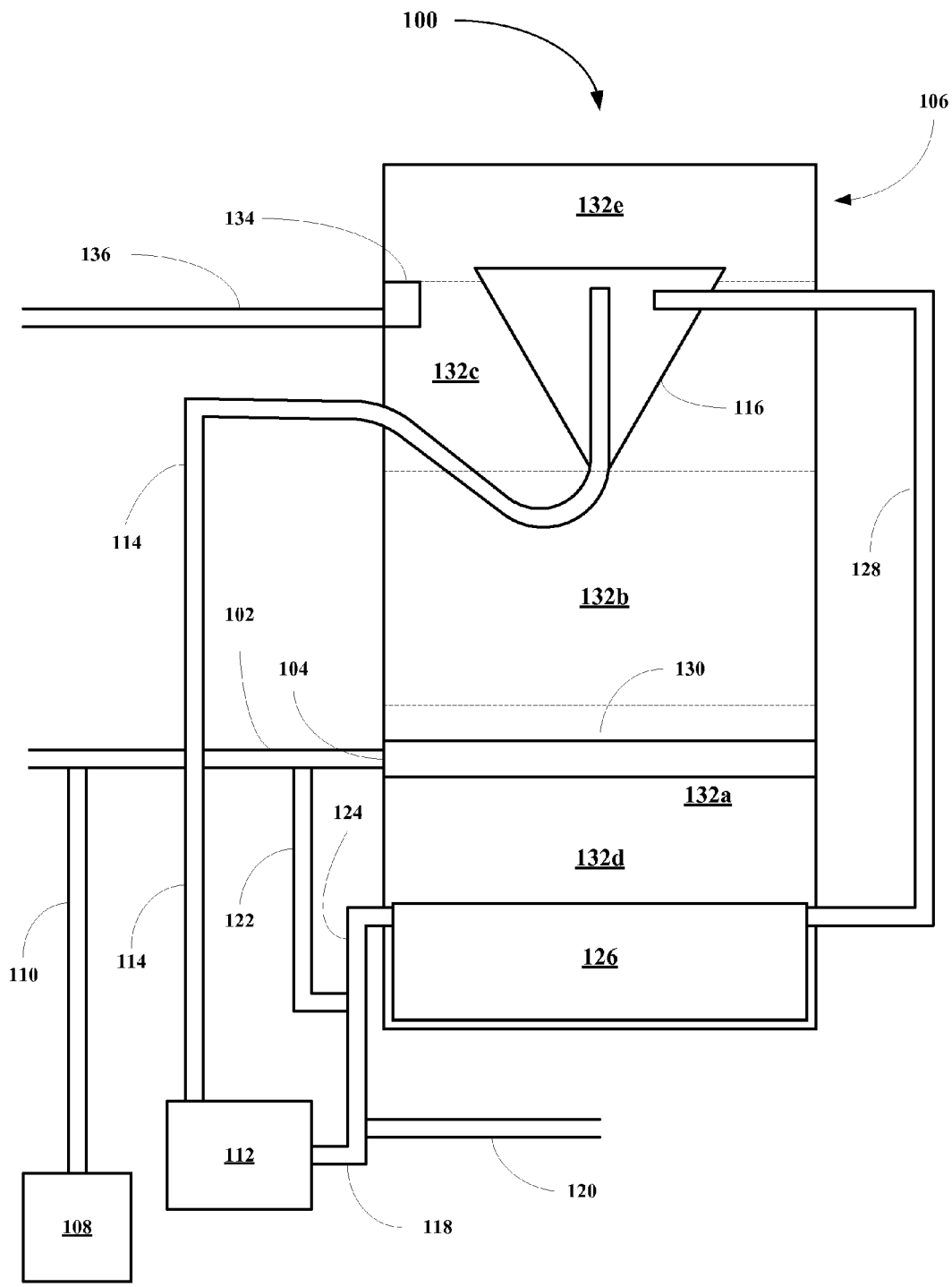
FIGS. 1A depicts an embodiment of a denitrification system of this invention.

The inventors have found that a system can be constructed for reducing the nitrogen content in the form of nitrates, nitrites, residual ammonia, and/or other nitrogen-containing compounds below a desired low level using an absorbent in conjunction with active microorganisms. The absorbent is used to rapidly absorb or adsorb nitrates and/or nitrites in a stream to provide sufficient time for the microorganisms to convert the nitrates and/or nitrites into nitrogen gas and to consume ammonia and other nitrogen-containing compounds, where the microorganisms primarily convert and consume nitrogen-containing compounds via an absorption process from the stream, thus reducing the nitrogen-content of a waste stream below a given level. The denitrification system uses a counterflow arrangement of absorbent versus contaminated nitrogen rich water so that cleaned water flows up the column, while absorbent falls down the column. The absorbent is collected in a set of inducers and recycled to the top of the column into an ultra low pressure drop hydrocyclone apparatus, while raw water is introduced into the column into a mid or lower section of the column through a distribution header so that the new waste water and microorganism nutrients are evenly or uniformly distributed throughout the column for improved microorganism activity and reduced channeling. The even or uniform distribution of the nutrient rich waste water permits an active microorganism conversion zone, where nitrogen-containing compounds (e.g., nitrates, etc.) are converted to nitrogen gas. Cleaned water is then withdrawn at the top of the column. The system also includes a recirculation of water used in the inducers, with part being shunted into the raw water and with part being forwarded for handling microbial waste.

Nitrate Removal

A new combined process has been developed as a treatment in a nutrient removal process. Nitrate, nitrite or other nitrogen compound removal and ammonia polishing are accomplished in a series of Biological Regenerated Adsorptive (BioRA) cells. The BioRA cells use two different treatment techniques. Initially, the cells employ a single unit operation, physical adsorption and/or absorption. The second technique employs a biological denitrification process that requires a period of time to reach steady state.

The physical adsorption and/or absorption process is used when the system is initially activated to remove nitrate and/or nitrite prior to discharge or even nitrogen mass from a fluid such as a partially treated waste water prior to discharge, where the partially treated water can be an effluent from an ammonia removal system. The volume of media needed until the biological denitrification process takes over, is determined by time, hydraulic capacity of the system and the average nitrate concentration. Subsequently, once a satisfactory biomass is established, the denitrification process removes nitrogen contaminants present in the water as well as nitrogen contaminants absorbed on or in the media through desorption from the media as the water nitrogen contaminants are consumed. Nitrates are converted into nitrogen gas, which is removed from the system as an inert gas. The microorganism form an active film on the surface of the media, which comprises a surfactant modified zeolitic media. The zeolitic media can be a natural zeolitic material such as a mordenite, a fugistite or a clinoptiloliteor a synthetic zeolitic material or mixtures or combinations thereof.

In certain embodiments, a plurality of BioRA cells are arranged in a series configuration to achieve a desired nitrogen treatment goals. Each BioRA cell is essentially an upflow absorber for nitrates, ammonia and some additional anions.

The BioRA media is regenerated by bacteria. Bio-regeneration produces a symbiotic effect. The biological activity reduces the waste produced by regeneration of the media and the media reduces the toxic effects of the contaminants on the bacteria while acting as a surge device to permit treatment during startup and smooth out rapid concentration changes caused by accidental spills.

The BioRA cells were tested to prove their cost effectiveness for treating specific types of waste water and to evaluate the efficiency of media regeneration.

Instrumentation & Controls

Instrumentation and controls for the treatment system will be integrated and configured to minimize the amount of time that an operator will need to monitor and remain with the system to ensure that it is operating properly.

Detailed Description of Denitrification System

The denitrification subsystem for nitrate/nitrite removal and ammonia polishing comprises as plurality of series configured biological regenerated adsorptive cells. The cells use two different treatment techniques. Initially, the cells employ a single unit operation, physical absorption of nitrogen-containing compounds. The second operation employs a biological denitrification process that requires a period of time to reach steady state. The denitrification subsystem also includes a safe path from which untreated water is removed and treated water is returned.

The physical adsorption process is used to absorb nitrogen contaminants for subsequent biological denitrification. The absorbent is especially useful during startup, nitrogen surges, or other disruptions. For example, when the system is initially activated, the nitrogen mass of a waste water or the remaining nitrogen mass in the partially treated waste water is absorbed to permit the biological denitrification process to start and achieve steady state. The volume of media needed until the biological denitrification process takes over, is determined by time, hydraulic capacity of the system and the average nitrate/nitrite and other nitrogen contaminant concentrations. Subsequently, once a satisfactory biomass is established, the denitrification process removes nitrogen-containing compounds present in the water as well as nitrogen-containing compounds absorbed on or in the media. Nitrates/nitrites and nitrogen-containing compounds are converted into nitrogen gas which is removed from the system as an inert gas.

The cells are arranged in a series configuration to achieve the nitrogen treatment goals. Each cell is essentially an upflow absorber for nitrates, nitrites, ammonia and some additional anions.

The cell media are regenerated by the bacteria in the cells. Bio-regeneration produces a symbiotic effect. The biological activity reduces the waste produced by regeneration of the media and the media reduces the toxic effects of the contaminants on the bacteria, while acting as a surge device to permit treatment during startup and smooth out rapid changes in nitrogen contaminant concentrations in the waste water caused by accidental spills or other accidental contaminations.

Bench and full scale testing of the cells was used to verify that bio-regeneration cells were cost effective for the specific type of water that would be treated and to evaluate the efficiency of media regeneration. Testing was also performed to determine the effects of the super-salinity on the media and to determine some estimate of the attrition rate of the media.

Embodiments of the BioRA apparatuses, methods and enabling technologies of this invention comprises adsorption/desorption, continuous plug flow device and method for denitrification of high nitrogen content waste waters. Each BioRA cell supports re-circulation of media and water used to wash the media. The re-circulation includes a loop that re-circulates media and a loop that re-circulates the wash water. The media re-circulation loop starts with inducer feed water, then inducer feed water combined with media and waste, then the inducer feed water, waste and media are separated and the inducer feed water starts again. The present invention has benefits that backwash water is not needed. The two loops provide sufficient particle shearing to dislodge dead or weakly bond microorganism films growing on the exterior surface of the media, but insufficient to cause degradation of the friable media—that is the shear causes only minimal degradation (reduction of particle size) of the media. The term minimal in this context means less than about 1 wt. % of the media undergoes a size reduction per day (24 hours) or less than about 0.1 wt. % per cycle. In other embodiments, the term minimal in this context means less than about 0.5 wt. % of the media undergoes a size reduction per day or less than about 0.05 wt. % per cycle. In other embodiments, the term minimal in this context means less than about 0.1 wt. % of the media undergoes a size reduction per day or less than about 0.25 wt % per cycle. In other embodiments, the term minimal in this context means less than about 0.09 wt. % of the media undergoes a size reduction per day or less than about 0.015 wt % per cycle. Thus, the loops achieve media washing, while causing minimal particle size reduction. The media recycle loop comprises inducers where downward flowing media enters one of a plurality of inducers which is swept along the inducers by the recirculating backwash. The flow the recirculating backwash is sufficient to shear the media dislodging dead or weakly bond biofilm from the media and lifts the media to the ultra low pressure drop hydrocyclone.

Raw water is introduced into the cells via a distributing header that produces a substantially or even distribution (i.e., a uniform or substantially uniform distribution) of incoming water that may or may not carry microorganisms, microorganism nutrients and other materials to achieve a desired environmental profile throughout the cell. The term substantially here means that the profile of incoming nutrient rich water is even or uniform across the cells cross-section at the header, with no more the a 10% different in nutrient concentration across the cross-section at the header. In certain embodiments, the nutrient concentration difference by no more than 5%. In other embodiments, the nutrient concentration difference by no more than 1%. Such even or uniform distribution improves microorganism utilization and reduces hot spots and channeling. The even or uniform distribution is achieved through a designed pattern of holes in the header so that each hole attains a near equal flow of nutrient rich incoming water. The even or uniform distribution cause the zone above the header to operate in an expanded bed mode, where particles are separated, but do not move independently. Thus, the cells becomes a plug flow reactor with improved microbe activity throughout the zone above the header.

A portion of the recirculating water used in the inducers is feed into the raw water before it enters the distributing header to complete the backwash recirculation loop. By controlling the microorganism composition and the nutrient balance in the cells, the cells achieve an integrated production of anoxic conditions, but may also contain aerobic as described in the following paragraph, above the distributing header and a respiratory inhibited zone below the distributing header. The respiratory inhibited zone is the zone where electron donors, carbon and or other inhibiting nutrients are supplied to the biomass by desorption and endogenous decay. The zone becomes suboxic just prior to the slurry entering the collection and up lift assembly.

Each cell will generally include three zone: an aerobic zone, an anoxic zone and a respiratory inhibited zone. However, in certain cells, the aerobic zone may be minimal or absence depending on the initial conditions of the incoming water. The microorganisms that degrade nitrate and nitrite are relatively sensitive to dissolved oxygen (DO). At DO values above about 0.8 mg/L, these microorganism use molecular oxygen as the electron acceptor instead of oxides of nitrogen until the DO value falls below about 0.4 mg/L. Such an aerobic zone will exist whenever the DO value is high enough to inhibit the nitrate/nitrite destroying microorganisms proliferation and aerobic microorganism as added to the water to reduce the DO value so that an active anoxic zone can be established in the cells. Thus, the aerobic zone can range between about 0% of the height of the cell to about 30% of the height of the cells. The respiratory zone can range from about 7% to about 30% of the height to the cell. The remainder of the cells will be the anoxic zone. The height is measured from the exit of the ultra low pressure drop three phase separating hydro cyclone. The cell condition are thus adjusted so that a desired ratio is produced between the three zones: the aerobic zone, the anoxic zone and respiratory inhibited zone. The ratio can be about 30:40:30 to about 0:70:30 to about 0:93:7 to about 30:63:7 or any other value depending on the waste water to be treated and on the desired outcome.

The cells operate on an indirect biological desorption process. The media is primarily responsible for fast absorption or adsorption of the nitrates/nitrites in the waste water and to support the formation of microbial film on the surfaces thereof. The microorganisms degrade the nitrate/nitrite in the water. As the water levels of the nitrate/nitrite are reduced, absorbed or adsorbed nitrate/nitrite in or on the media desorb into the water so that the bulk of the nitrate/nitrite degradation occurs at the film-water interface.

The distributing header is designed to achieve bulk flow distribution control so that nutrients and nitrate/nitrite rich water is evenly or uniformly distributed across a cross-section of the cells as described above.

The cells also include a gas back pressure control utilizing the media loop. As nitrogen gas and carbon dioxide gas are produced due to microbial degradation of nitrates/nitrites in the water, a substantial amount of the gas collects as bubbles on the media, which is flowing down through the cells to be collected and recirculated through the inducers in the respiratory inhibited zone of the cells. Oxygen gas content can optionally be controlled by an aerator connected to the media recirculation loop. Thus, each BioRA cell can be operated with different gas back pressure control using microbial produced nitrogen and carbon dioxide in the absence or presence of added oxygen gas in the form of pure oxygen, air or any other oxygen containing gas.

The media recirculation system is not only used to recirculate the media, the recirculation also server as a selective biomass reject and media cleaning system. As stated above, the media is collected into a plurality of inducers, where a recirculating backwash water flow subjects the media particles to shear sufficient to dislodge dead microorganisms and/or weakly bound microbial films as the media is being recirculated. Thus as the recirculating media stream enters the ultra low pressure drop hydrocyclone, the media is cleaned from shearing and clean water entering the exit of the hydrocyclone acts to achieve a separation between the cleaned media and the dislodged dead microbes and weakly bound microbial films. The recirculation loops also act as a biomass growth limitation process, where biomass growth can be regulated to reduce biomass plugging and other adverse tendencies of bio-remediation processes. The loops and removal systems also permit continuous carbon, electron donor and respiration product removal from the biomass.

As stated above, the ultra low pressure drop three phase separating hydrocyclone provides upper flow of cleaned water to wash the sheared media as the sheared media particle flow downward through and out of the hydrocyclone. The inducer system of media pickup and recirculation is specifically designed to control shear (energy) for handling friable solids so that dead and weakly bound microbial films can be removed from the media with minimal particle size reduction of the friable solid particulate media.

The denitrification system includes a safe path as described below as a dilution control system. Each BioRA cell pulls water from the safe path and discharges cleaned water to the safe path. Thus, for series arranged BioRA cells, the first cell draws water from the safe path that is a mixture of all the untreated water entering the safe path and a portion of the treated water from the first cell, while the second BioRA cell draw water from the safe path that is a mixture of all the treated water from the first cell not mixed in its feed and a portion of the discharge of the second cell and subsequent cells operate in the same method. As a result, the safe path water has a continuously decreasing nitrogen content as the water flow downstream through the denitrification system. While many of the embodiments of this invention utilize series configured BioRA cells, the denitrification system can use parallel BioRA cells or a combination of series and parallel BioRA cells depending on outcome and design requirements.

In series operations, a denitrification system of BioRA cells configured in series can be operated so that water passes downstream and rejected water can be passed upstream or downstream. Moreover, the cells or units can be configured in a manner to take advantage of endogenous decay, thereby reducing the methanol consumption as well as the amount and characteristic of the waste production.

In series operations, the denitrification system includes a two stage methanol control. Intentional methanol slip with DO measurement of aerobic zone is used for automatic feedback control of methanol introduction, while methanol control trim using DO measurement of enzymatic nitrite reduction is used as cascaded trim of automatic feedback control of methanol introduction. While methanol is used as the carbon nutrient source, any other nutrient source can be used depending on the microorganisms being used and the environment to be achieved, e.g., the ratio of aerobic, anoxic and respiratory inhibited zones.

Because the biomass produces ammonia, ammonia reduction in the denitrification system is reduced by biomass reject and a caustic lysing scheme. For system where the denitrification system is part of a treatment system that include a precipitation system and an ammonia stripping/absorbing system, this rejection and lysing is achieved in the precipitation system where caustic is used to precipitate certain minerals in the water prior to subsequent process.

There are two distinctly different BioRA cell apparatus designs, possibly three that can produce a desired BioRA effect. A number of different media are envisioned for handled other constituents. The present design can be use with only minor variations to remove sulfates and there are several versions for BTEX biomass.

New Embodiment—Multipoint Pickup with Inducers

Another embodiment the present invention provides a denitrification system including at least one denitrification column, where the column or unit includes an inlet, an outlet, an optional aerobic zone, an anoxic zone, a clean water zone, a respiratory inhibition or inhibited zone, and a gas overhead zone. The unit also includes an ultra low pressure drop hydro cyclone, a water recirculation and media recirculation subsystem. The unit also includes a nitrogen-rich, nutrient rich, and microbial rich raw water supply distributor adapted to produce an even or substantially even distribution (i.e., a uniform or substantially uniform distribution) of nitrogen-rich, nutrient rich, and microbial rich raw water across a cross-section of the column to improve nutrient utilization and reduce hot spots and channeling. The column is a counterflow column with water flowing up as it is being denitrified and absorptive media flowing down. The absorptive media is collected in the water recirculation and media recirculation subsystem, where collected media is mixed with recirculating water and lifted into the hydrocyclone. The water entering the water recirculation and media recirculation subsystem is sufficient to dislodge dead microbes and weakly bound microbial films from the media, but insufficient to reduce media particles size. Thus, the shear is carefully controlled to achieve media cleaning, while minimizing particle size reduction of the media. The inlet is adapted to receive an aqueous stream to be treated containing an unacceptable concentration of total nitrogen. The water and media recirculation subsystem includes a solid nitrogen absorbent and a bioactive slurry, where the assembly is adapted to circulate the slurry from a bottom of the respiratory inhibited zone to a top of the anoxic zone. The absorbent absorbs the nitrates and nitrites in the aqueous upflowing stream, while microorganisms in the bioactive solution convert the nitrates and/or nitrites into nitrogen gas in all of the zones of the column, except of gas overhead zone, while ammonia and other nitrogen-containing compounds are consumed by the microbes. The water in the slurry as it is being treated progresses from the stream inlet to the stream outlet.

Another embodiment of the water and media recirculation subsystem of this invention includes a plurality of media lift headers and at least one inducer feed header. Each media lift header includes a straight stem having a plurality of branches and an output manifold. The media lift headers also include a flush line having an input manifold. Each flush line includes a first bend and a straight segment, where the first bend positions the straight segment to run above the stem of the media lift header. The flush line includes a second bend, where the flush line enters the stem just upstream of the output manifold. The second bend is a complex bend have an upward segment and a downward segment angled into the stem. The angled segment makes an angle g with the stem of between about 15° to about 45°. In other embodiments, the angle $\gamma$ is between about 20° and 40°. In other embodiments, the angle $\gamma$ is between about 25° and 35°. In other embodiments, the angle $\gamma$ is about 30°.

Each branch includes an inducer and an aperture. The branches make an angle $\delta$ with the stem between about 30° and about 60°. In certain embodiments, the angle $\delta$ is between about 40° and 50°. In other embodiments, the angle $\delta$ is about 45°. The inducer feed header includes a plurality of distribution nozzles.

The subsystem also includes a plurality of conduits connecting the nozzles to the inducers.

As the media rich slurry flows down the column, the media rich slurry is funneled into the apertures in the media lift headers. The number of apertures is designed to be sufficient to provide a more uniform collection of the slurry, while minimizing inhomogeneities in collection of the slurry into the media lift headers. The conduits supply recirculation water to the inducers associated with the apertures at a non-aspirating flow rate. In certain embodiments, the flow rate is the same or substantially the same as a flow rate of the slurry entering the branches of the media lift header through the pickup apertures. The terms substantially the same as used here means that the flow rate of the recirculation water and the flow rate of the slurry into the branches through the apertures is within about 10% of each other. In other embodiments, the flow rates are with about 5% of each other. In other embodiments, the flow rates are with about 2.5% of each other. In other embodiments, the flow rates are with about 1% of each other. The diluted medium slurry then proceeds down the media lift header.

The media lift headers taper down from their output manifolds to their last branches. The tapering is designed to maintain the slurry flow through the header at a rate that reduces media particle size reduction and reduces slurry separation.

The header output manifolds are connected to lift lines situated exterior to the column. The lift lines are combined into a main line prior to the main line entering the column to feed the hydrocyclone. The lift lines and main line are configured in such a way as to reduce or eliminate flow into an unused or plugged lift line as is well known in the art. The lift lines and main line is constructed with branch connections to form a distributed slurry systems.

The input and output manifolds of the lift header and feed headers are all situating so that they all have the same or substantially relative hydraulic loss distribution. The term substantially means that the relative hydraulic loss distribution of the headers are within about 20% of each other. In other embodiments, the relative hydraulic loss distribution of the headers are within about 10% of each other. In other embodiments, the relative hydraulic loss distribution of the headers are within about 5% of each other The recirculation water is supplied by the recirculation water pump assembly to the input manifolds of the feed headers at a rate to maintain a non-aspirating flow into the inducers. The recirculation water pump assembly is also connected to the input manifolds of the flush lines of the media lift header. The flush lines are used to unplug the manifold and lifts lines if they plug. Flushing of the manifold and lift lines may be performed on a regular schedule for maintenance purposes or only when needed.

Aspects of Methods Associated with Operation of the Denitrification System

Embodiments of this invention relate to an adsorption method including supplying a waste water stream having a high level of a contaminant such as oxides of nitrogen to a bio-denitrification column through a distributor. The distributor is located in a lower middle region of the column. The method also includes supplying a medium slurry into an upper middle region of the column through a venturi feed apparatus. The two supplies produce a counter-flow zone in the column, which extends from a position immediately below the distributor to an output of the venturi apparatus. The counter-flow comprises medium flowing down from the venturi feed apparatus and water flowing up from the distributor. The water distributor supplies water distributed across the entire cross-section of the column at a rate that produces an expanded bed under plug flow conditions throughout the column. The expanded bed is defined as an upward liquid flow through medium bed at such a velocity as to cause the individual particles to partially separate, increasing the placed volume of the bed, but not at a velocity to change their relative position to each other. In certain embodiments, the velocity is sufficient to partially separate at least 70% of the particles in the medium. In other embodiments, the velocity is sufficient to partially separate at least 80% of the particles in the medium. In other embodiments, the velocity is sufficient to partially separate at least 90% of the particles in the medium. The expanded bed reduces or eliminates channeled flow in the column. Below the counter-flow zone is a co-flow zone, where the medium and residual water flows into a respiratory inhibited zone (RIZ) and ultimately into a medium slurry collection and uplift subsystem.

Embodiments of this invention relate to an adsorption method including establishing a stationary, mass transfer zone within the counter-flow zone of the column, where the medium is continuously replaced maintaining a static adsorptive capacity in the counter-flow zone of the column. In this zone, active microbial growth is occurring at a rate of at least doubling a microbe population in the counter-flow zone. The stationary zone is limited by x/m ratio at maximum concentration verses breakthrough at minimum x/m. The stationary zone reduces the total volume of medium required to operate the bio-denitrification unit—regenerated medium is always being introduced, while fully populated medium is withdrawn and regenerated.

Embodiments of this invention relate to an adsorption method including biologically assisted regenerating the medium, which is an integral feature of the method of this invention as this assisted regeneration is integral to maintaining the stationary, mass transfer zone. The microbes in the medium slurry forms a film on the medium. The medium is an active nitrate/nitrite adsorbent/absorbent. Thus, a portion of the nitrate/nitrites in the waste water is adsorbed and/or absorbed in and on the surface and pores of the medium. The microbes actively convert nitrates/nitrites in water surrounding them, the water between the particles of the medium. This generally causes the microbes near the surface of the medium to be starved of nitrates and/or nitrites. However, because the medium is an active nitrate/nitrite adsorber and/or absorber, as the nitrates and/or nitrites are depleted in the interstitial water, the nitrates and/or nitrites adsorbed and/or absorbed in and on the surface and pores of the medium is desorbed becoming a source of nitrates and/or nitrites for the microbes near the surface and via diffusion for the microbes on the outer part of the film. In this way, the adsorptive/absorptive capacity of the medium is regenerated so that upon collection, uplift and reintroduction through the venturi feed apparatus, the medium is now capable adsorbing/absorbing nitrates and/or nitrites in the upflowing water as the medium proceeds down through the expanded bed portion of the columns.

Embodiments of this invention relate to an adsorption method including continuously cleaning the medium of foreign material in the co-flow zone of the column and the up-lift subsystem of the column. The column is divided by activity into four primary zone. The upper most zone comprises cleaned up-flowing water. The upper middle zone comprises an expanded bed medium zone in which anoxic denitrification occurs. The middle zone is marked by rapid microbial growth at a rate that results in a 1.5 to 5 times growth rate or increases viable or volatile microbes from about 1000 mg/L at the exit of the slurry feed to about 3000 mg/L at the distributor. The next zone is adjacent the water distributor and is an aerobic zone, where aerobic microorganisms reduce the dissolved oxygen (DO) levels to promote anoxic microorganism growth in the anoxic zone of the column. The in-coming waste water has a defined and controllable DO level and the amount of aerobic microorganisms are controlled by the DO level and are sufficient to reduce the DO level into an anoxic DO level. The lower zone is the respiratory inhibited zone (RIZ), where the medium is no longer in an expanded format and microbial growth is inhibited. The zone becomes suboxic just prior to the medium collectors and results in a reduction of a viable or volatile microbial population, which is rapidly re-established as the slurry is up-lifted and reintroduced into the column through the slurry feed unit.

Embodiments of this invention relate to an adsorption method including establishing a safe path to which the bio-denitrification unit acts as an attached reactor in an adsorption scheme. Mathematically, the safe path and the bio-denitrification units may be modeled as a continuous stirred tank reactor (CSTR), where the units or attached reactors are operating under plug flow conditions. Thus, the safe path is a fixed volume path into which a waste water stream is added and a cleaned water stream exits. Along the length of the safe path, waste water in different degrees of cleaning is being continuously withdrawn into the attached reactors and cleaner waste water is being sent back to the safe path, where that water is mixed with the water in the safe path to form the water for the next bio-denitrification unit (which are arranged in series). The water exiting the last bio-denitrification unit has a desired low nitrate/nitrite level and is now safe to be discharged into the environment. In certain embodiments, the water exiting each bio-denitrification unit is aerated as it flows through a spiral configured outlet pipe into a holding area, where the aerated water is allowed to attain a given dissolved oxygen value before it overflows into the safe path for use as a part of the water going into the next bio-denitrification unit or ultimately exits the bio-denitrification system.

Embodiments of this invention relate to a bio-filtration method including establishing a fixed microbial film surrounding the particles of the medium producing a two sided electron acceptor supply—part of the supply from the interstitial water between the particles and part of the supply from the adsorbed and/or absorbed electron acceptors on and/or within the medium, with the fixed or attached side supply maintained for the longest time and is the most consistent throughout the biomass life, when RIZ is considered.

Embodiments of this invention relate to a bio-filtration method including establishing rapid biomass generation due to the expanded bed, which provides underlying continuous logistics, i.e., supply of carbon, electron acceptor, and micronutrients to all of the biomass and removal of products from all of the biomass and due to a fixed film biomass that moves, within column, toward greater levels of carbon and electron acceptors—toward the waste water distributors. In the present configuration, traditional inhibition limiting carbon and/or electron acceptor only takes place as the downwardly flowing medium exits the anoxic zone.

Embodiments of this invention relate to a bio-filtration method including establishing a continuous growth of biomass in the counter-flow, which provides a microbial environment allowing removal of ammonia through bio-synthesis.

Embodiments of this invention relate to a bio-filtration method including sustaining a sufficient amount of aerobic microbes in the microbes culture in the column to control a dissolved oxygen (DO) environment by controlled introduction of a DO level into the safe path connected to the denitrification units and via the counter flow of fixed film biomass and water to be treated from the anoxic zone to the aerobic zone.

Embodiments of this invention relate to a bio-filtration method including establishing of a safe path attached to the reactors (denitrification units) in biological treatment scheme. Mathematically, the reactors may be described as a Continuous Stirred Tank Reactors (CSTRs) operated under plug flow conditions. The safe path coupled with the reactors disposed in a series configuration, produces the mathematically smallest volume of biomass required to remove substrate while allowing unlimited range of flow treatment.

Embodiments of this invention relate to a biologically assisted adsorbent regeneration method including continuous integral regeneration of adsorbent by desorption of adsorbed and/or absorbed nitrates and/or nitrites driven by the bio-cleansing of interstitial water and pore water in the co-current flow zone of the column.

Embodiments of this invention relate to a biologically assisted adsorbent regeneration method including establishing a regeneration area or a respiratory inhibited zone (RIZ), where the medium and interstitial water enters with a largest biomass, a highest concentration of carbon, electron acceptor and nutrients producing the highest specific denitrification rate in column. In certain embodiments of the column, the RIZ may be adjusted to intentionally reduce volatile biomass to support ammonia removal by synthesis.

Embodiments of this invention relate to a biologically assisted adsorbent regeneration method including establishing a suboxic zone in the column to determine nitrate to reductase interaction by DO measurement.

Embodiments of this invention relate to an electron donor and carbon supply control method including measuring dissolved oxygen in the aerobic zone to control substrate addition by feedback control. In other embodiments, the electron donor and carbon supply control method including measuring dissolved oxygen in the suboxic zone of the RIZ to trim the control of substrate addition by cascaded feedback control. In certain embodiments, the carbon supply, generally methanol, but other carbon sources or combinations are equally useable, is controlled to maintain a DO level between about 0.19 and 0.12. If the DO level goes above 0.19, then more carbon source is added. If the DO level drops below about 0.12, less carbon source is added.

In certain embodiments of the methods of this invention, microbe seeding is only performed at startup, planed shut downs or operational disruptions. However, in all cases, microbe seeding may occur during the course of routine operation, if the microbe population drops below a viable or volatile population insufficient to repopulate a sufficient population in the counter-flow and co-flow zone of the denitrification units.

Suitable Reagents and Components

Suitable mineral acids for use in the present invention include, without limitation, nitric acid, phosphoric acid, sulfuric acid, hydrochloric acid, acetic acid, or mixture or combinations thereof. In certain embodiments, the mineral acid comprises nitric acid or sulfuric acid.

Suitable bases for uses in the present invention include, without limitation, alkali metal hydroxides, alkaline metal hydroxides, alkaline metal oxides, certain transition metal hydroxides, and mixture or combinations thereof. In certain embodiments, the base comprises sodium hydroxide, potassium hydroxide, calcium oxide, calcium hydroxide, cesium hydroxide, barium hydroxide, and mixtures or combinations thereof.

Suitable microorganisms for use in the present invention include, without limitation, any denitrifying bacteria or other microbes or mixtures or combinations thereof. Exemplary examples include, without limitation, heterotrophic bacteria (such as *paracoccus denitrificans* and various pseudomonads), although autotrophic denitrifiers have also been identified (e.g., *thiobacillus denitrificans Micrococcus denitrificans/Paraoccus denitrificans, Pseudomonas*, etc.). Denitrifiers are represented in all main phylogenetic groups. Generally several species of bacteria are involved in the complete reduction of nitrate to molecular nitrogen, and more than one enzymatic pathway have been identified in the reduction process. Any suitable bacteria may be used in the denitrification cells or units of this invention, such as bacteria of the genera *Aeromonas, Psuedomonas, Bacillis*, or mixtures or combinations thereof. In certain embodiments, the culture used in the bio-denitrification units include about 5% aerobic microorganisms, which are used to control the dissolved oxygen (DO) level in the units. However, the exact ratio of anoxic microbes to aerobic microbes may be varied based on the waste water contaminant composition. Measurements of the DO level in two zones of the units are in a cascade control loop to control food and micro-nutrients to the column to support robust microbial growth. The terms microorganism and microbes are used interchangeably throughout the specification. In certain embodiments, the microbes are mesophilic microbes, while in other embodiments, the microbes are heterotropes, while in other embodiments, the microbes are thermophilics microbes, while in yet other embodiments, the microbes are mixture of two or more of these classes of microbes.

Suitable absorbent media for use in the present invention include, without limitation, natural zeolitic materials, surfactant modified zeolitic materials, synthetic zeolitic materials, surface modified synthetic zeolitic materials, clays, activated carbon and other adsorbing and or absorbing granular materials. Exemplary examples of suitable zeolitic materials include, without limitation, naturally occurring zeolitic materials and synthetic zeolite materials. Zeolites are minerals that have a micro-porous structure. They are basically hydrated alumino-silicate minerals with an "open" structure that can accommodate a wide variety of cations, such as $Na^+$, $K^+$, $Ca^{2+}$, $Mg^{2+}$ and others. Natural zeolites form where volcanic rocks and ash layers react with alkaline groundwater. Zeolites are the aluminosilicate members of the family of microporous solids known as "molecular sieves". The term molecular sieve refers to a particular property of these materials, the ability to selectively sort molecules based primarily on a size exclusion process. This is due to a very regular pore structure of molecular dimensions. The maximum size of the molecular or ionic species that can enter the pores of a zeolite is controlled by the diameters of the tunnels. These are conventionally defined by the ring size of the aperture, where, for example, the term "8ring" refers to a closed loop that is built from 8 tetrahedrally coordinated silicon (or aluminum) atoms and 8 oxygen atoms. These rings are not always perfectly flat and symmetrical due to a variety of effects, including strain induced by the bonding between units that are needed to produce the overall structure, or coordination of some of the oxygen atoms of the rings to cations within the structure. Therefore, the pore openings for all rings of one size are not identical. The adsorption properties applicable to the present application are primarily electrostatic in nature and are primarily surface charges. The crystal structure is of interest only in the context of the structures ability to trap micelles or micellular structure in such a way as to make nearly permanent the surfactant such as a hexadecyltrimethylammonium (HDTMA) surfactant in surfactant modified zeolitic material, where the surfactant flips the surface charge to a specific charge density per unit area producing nitrate selective binding sites.

Suitable microorganism nutrient mixtures for use in the present invention include, without limitation, methanol, ethanol, or any other carbon source for use with the above listed microorganisms or any other microorganisms that degrade nitrates and/or nitrites and/or other nitrogen containing compound amendable to biodegradation.

First Embodiment

Referring now to FIG. 1, an embodiment of a denitrification system, generally 100, is shown to include a waste water inlet conduit 102 connected to a waste water inlet 104. The system 100 uses an absorbent and microorganisms to absorb and convert nitrates and nitrites into nitrogen gas and consume ammonia/ammonium and/or other nitrogen-containing compound. The denitrification system 100 includes at least one absorber/biological denitrification unit 106. The unit 106 includes microorganism and microorganism nutrients supply unit 108 connected to the conduit 102 via a microorganism/nutrient conduit 110. The system 100 can also include a supply of mineral acid (not show) to adjust the pH of the water to an optimal level and a heating unit (not shown) to adjust the temperature of the water to an optimal temperature. The unit 106 includes media lift pump assemblies 112 for recirculating water and media in a two loop configuration. Recirculation water enters the pump 112 through conduit 114, which originals in a central region of an ultra low pressure drop hydrocyclone 116. The pump 112 pumps the recirculation water into an outlet conduit 118. The outlet conduit 118 is split into three conduits: a reject conduit 120, a shut conduit 122 and a recirculation conduit 124. The reject conduit 120 forwards biomass debris for process. The shut conduit 122 sends part of the recirculation water into the raw water to improve nutrient utilization. The recirculation conduit 124 is forwarded to an inducer or media lift subsystem 126, where the water flow is used to sweep media collected in the inducer or media lift subsystem 126 out through a media recirculation conduit 128. The water flow into and out of the inducer or media lift subsystem 126 is sufficient to lift the media for discharge into the ultra low pressure drop hydro cyclone 116. The water flow in the inducer or media lift subsystem 126 is sufficient to shear the media dislodging dead microbes and weakly bound microbial films from the media, but insufficient to reduce the particle size of the media to any appreciable extent, generally less than 0.05% of the particles undergo a reduction in size per cycle with the ultimate goal being less than 0.015% or no particles undergoing a reduction in size per cycle. Minimal reduction in size can be achieve through careful inducer design and water flow rate. The inducer has holes in the top through which the media are collected. The incoming water inlet 104 is connected to a distributor 130. The distributor 130 include holes in its bottom which are patterned so that the incoming nitrogen-rich, microbial rich and nutrient rich water is evenly or uniformly distributed through the unit 106 across a cross-section in a first zone 132a. In the first zone 132a, nutrient and water is evenly or uniformly distributed and, if present, oxygen is depleted through the action of aerobic microbes. As the water flow up and the oxygen contents is dropped below about 0.4 mg/L, an anoxic zone 132b is produced, where the microbes degrade nitrate and nitrites to nitrogen gas. As the water continues to rise, denitrified water accumulates in a clear water zone 132c and is exits the unit 106 through a trough 134, which is connected to an outlet conduit 136. As the media enter the hydrocyclone 116, clean water from the zone 132c is pulled into a bottom of the hydrocyclone 116 cleaning the media of the dislodged debris. As the media falls through the denitrification zone 132b, microbes degrade nitrate and/or nitrites from the water and from any adsorbed or absorbed nitrates/nitrites in the media. As the media fall past the distributor 130 and out of the zone 132a, the media enters a respiratory inhibited zone 132d, where microbial activity is arrested. The media is then collected in the inducer 126 and recirculated. The final zone 132e in the unit 106 is a head space filled with gas.

Second Embodiment

Figure 2A:
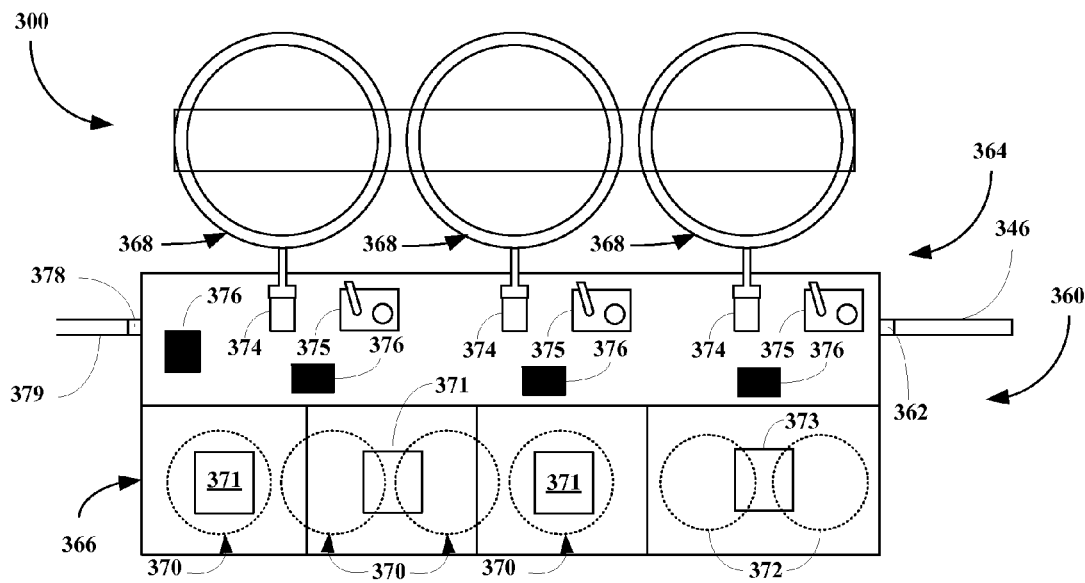
FIGS. 2A&B depict another embodiment of a denitrification system of this invention.

Referring now to FIG. 2A, the conduit 346 is connected to a denitrification subsystem 362 at an inlet 364, which uses an absorbent and microorganisms to absorb and convert nitrates, nitrites, residual ammonia/ammonium, or other nitrogen-containing compound into nitrogen gas. The denitrification subsystem 360 includes an absorber/biological denitrification section 366 and a nutrient supply section 368. The absorber/biological denitrification section 364 includes a plurality of absorber/biological denitrification units 370. The nutrient supply section 366 includes microorganism nutrients tanks 372 and associated hatches 373 for filling the tanks. The nutrient supply section 366 also includes mineral acid tanks 374 and associated hatches 375 for filling the tank. The mineral acid is used in the AR subsystem and in the denitrification subsystem. In the AR subsystem, the mineral acid is used to convert ammonia gas into the ammonium mineral acid salt liquor. In the denitrification subsystem, the mineral acid is used to adjust the pH to the optimal pH for supporting the microorganisms used to convert nitrogen-containing oxide, residue ammonia and other species into nitrogen gas. The denitrification section 364 includes media lift pump assemblies 376 for supplying waste water to the units 368 and recirculation pump assemblies 377 for supplying nutrients to the units 368. The denitrification section 364 also includes access hatches 378. The denitrification subsystem 360 includes an outlet 380 connected to a finished effluent conduit 381.

Figure 2B:
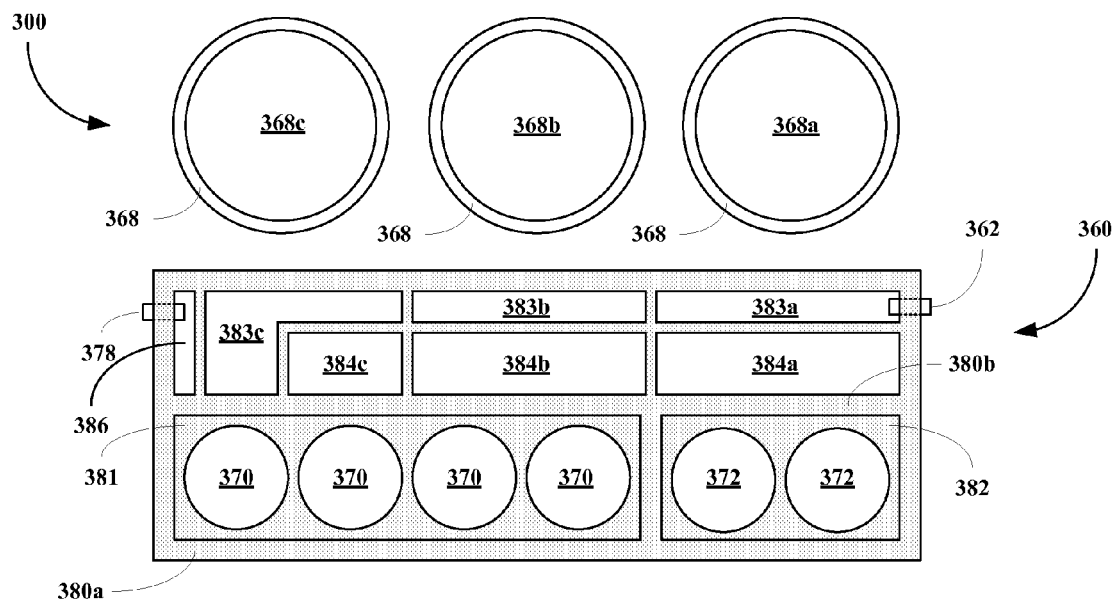

Referring now to FIG. 2B, the denitrification subsystem 360 includes outer and inner walls 380a&b. The subsystem 360 also includes a nutrient enclosure 381 of the nutrient section 366 housing the nutrient tanks 370 and a mineral acid enclosure 382 of the nutrient section 366 housing the mineral acid tanks 372. The subsystem 360. The subsystem 360 also includes safe paths 383a-c, one for each absorber/biological denitrification section 368. The paths 383a-c are associated with the recirculation pump assemblies 375. The subsystem 360 also includes auxiliary safe paths 384a-c for use with an optional final treatment subsystem (not shown) if needed to bring the denitrified water into final compliance with appropriate federal, state and local governmental regulations or to allow water to de-aerate as the water is discharged from the units 368. In certain embodiments, the unit discharge is a partially spiral discharge line that mixes the discharge water with air. The subsystem 360 also includes a discharge enclosure/reservoir 386 connected to the outlet 378.

Third Embodiment

Figure 3A:
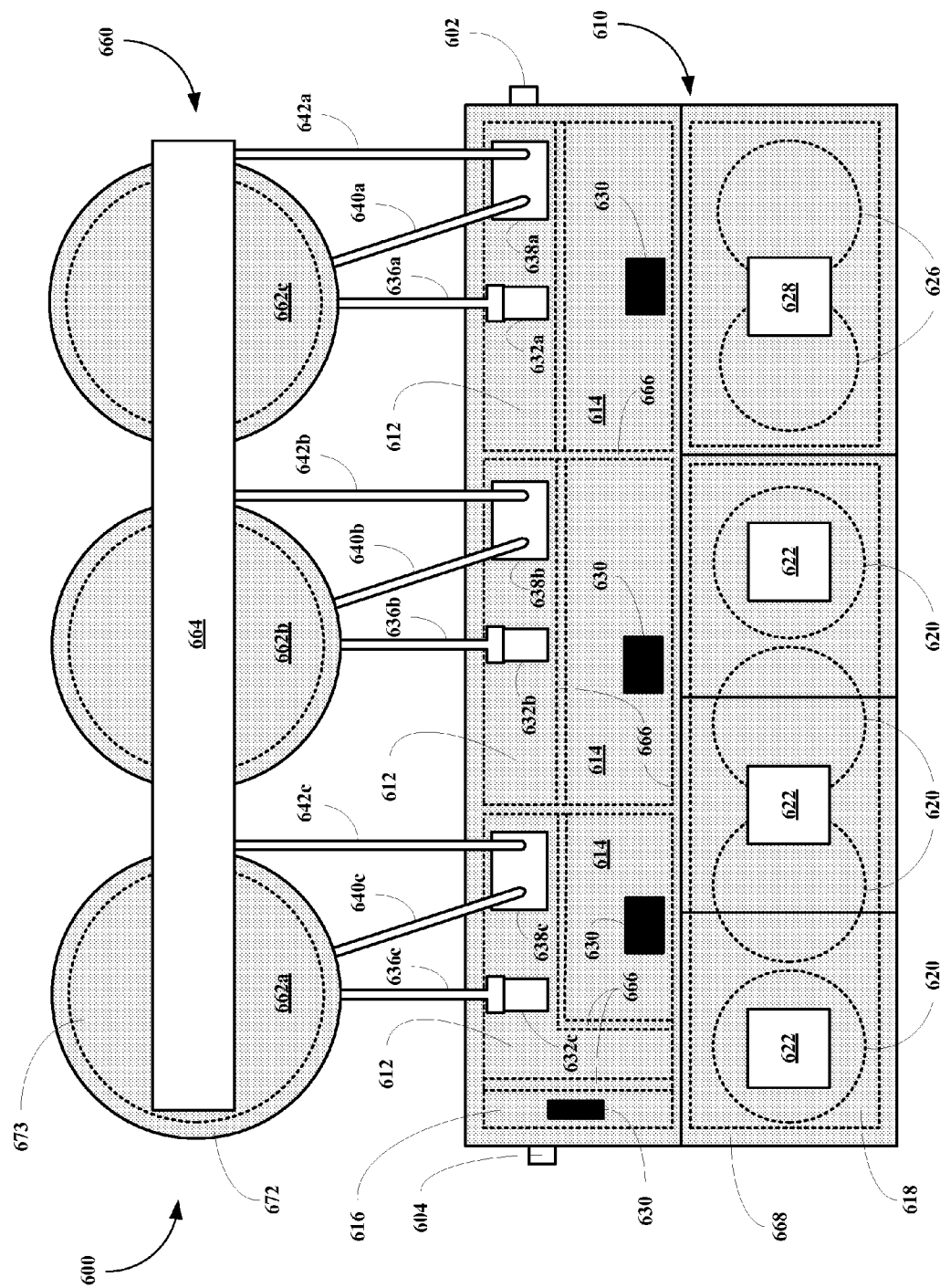
FIGS. 3A-C depict another embodiment of a denitrification system of this invention.

Referring now to FIGS. 3A&B, an embodiment of the denitrification subsystem, generally 600, is shown to include an inlet 602 and an outlet 604. The subsystem 600 includes a water and nutrient supply section 610 and an absorber/biological denitrification section 660.

The water and nutrient supply section 610 includes a safe path 612, optional final stage treating compartments 614 and an exit enclosure 616. The section 610 also includes a microorganism nutrient tank enclosure 618 including four microorganism nutrient tanks 620 and three access covers 622. The section 610 also includes an mineral acid enclosure 624 including two mineral acid tanks 626 and an access cover 628. The mineral acid from the tanks 626 are used in the AR subsystem to neutralize the ammonia and in the gentrification subsystem to adjust the pH of the waste water to a pH optimal for microorganism growth and stability. The section 610 also include access covers 630.

Figure 6:
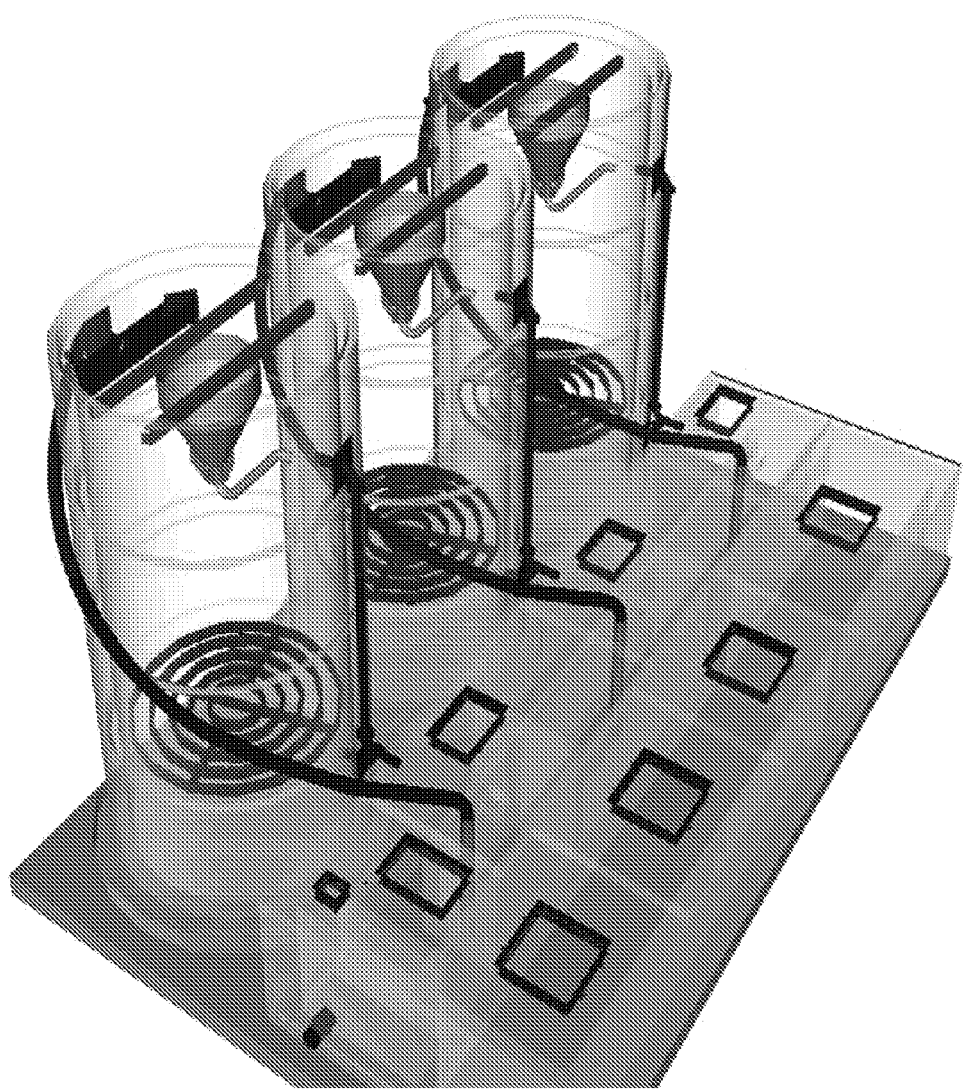
Figure 7A:
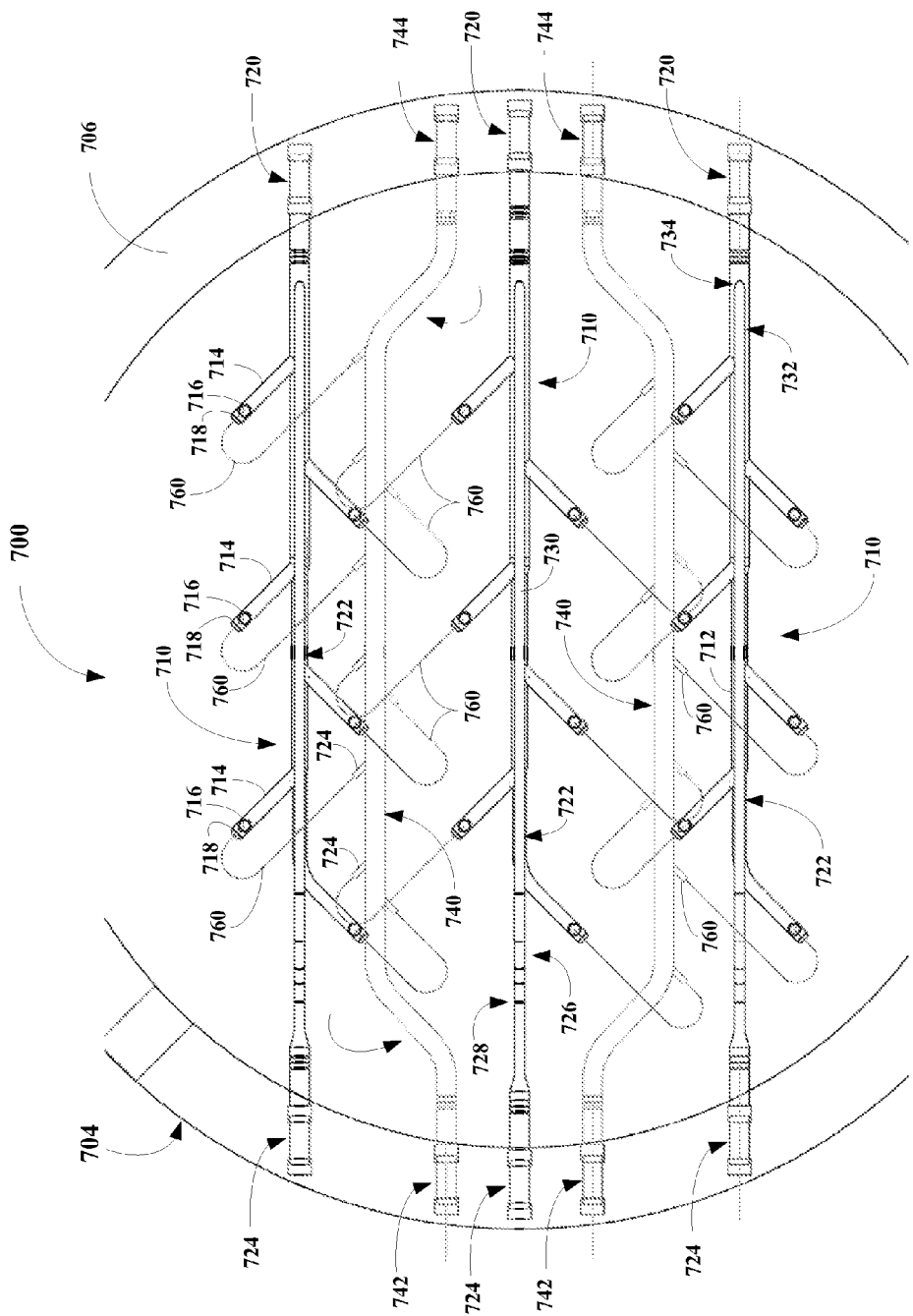
FIGS. 7A-I depict another embodiment of a denitrification system of this invention.
Figure 7B:
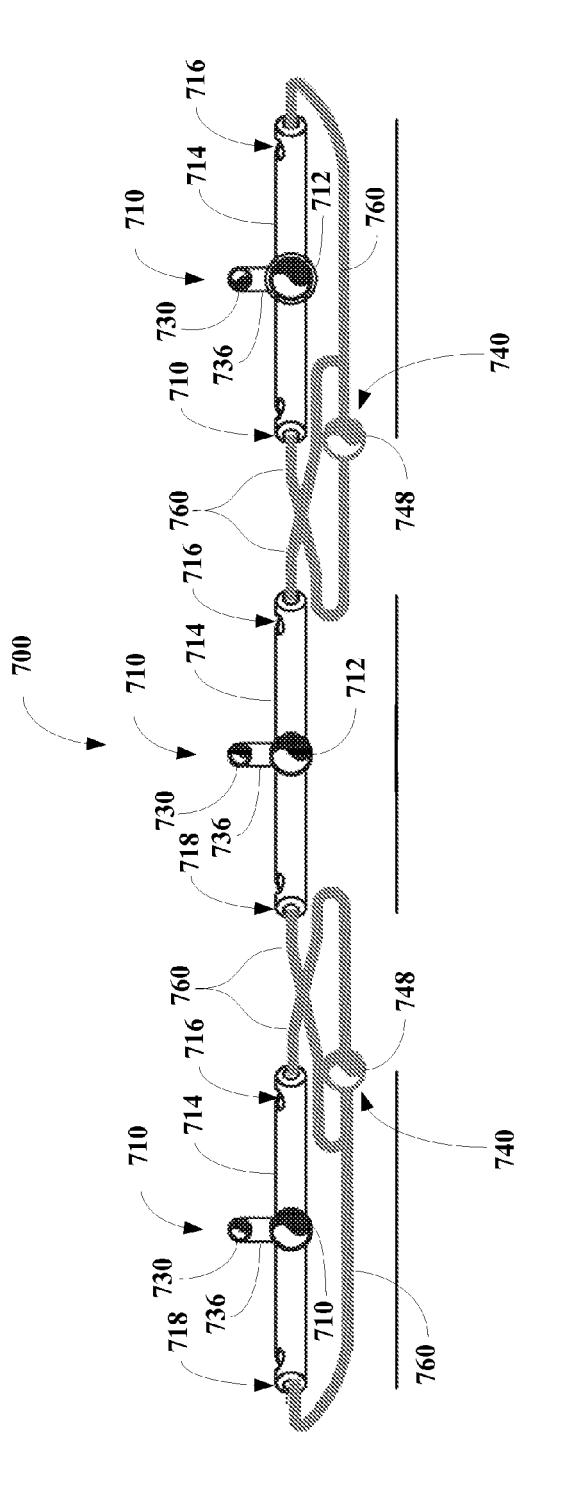
Figure 7C:
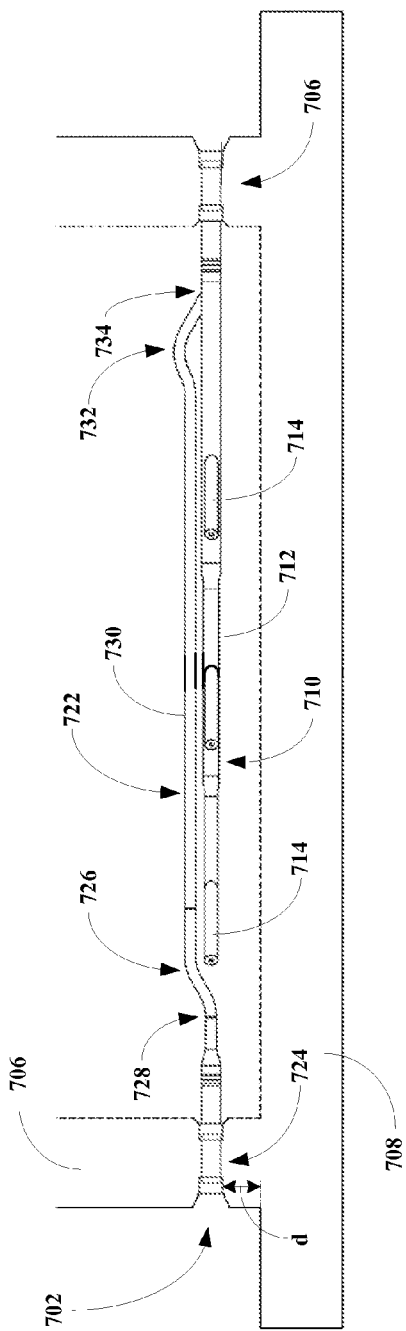
Figure 7D:
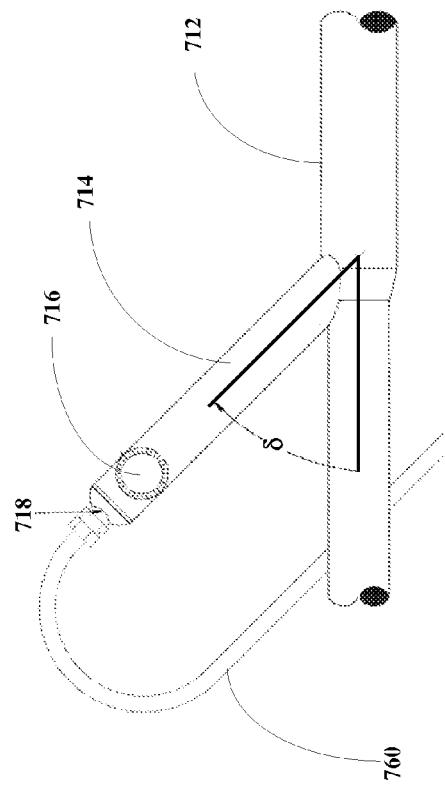
Figure 7E:
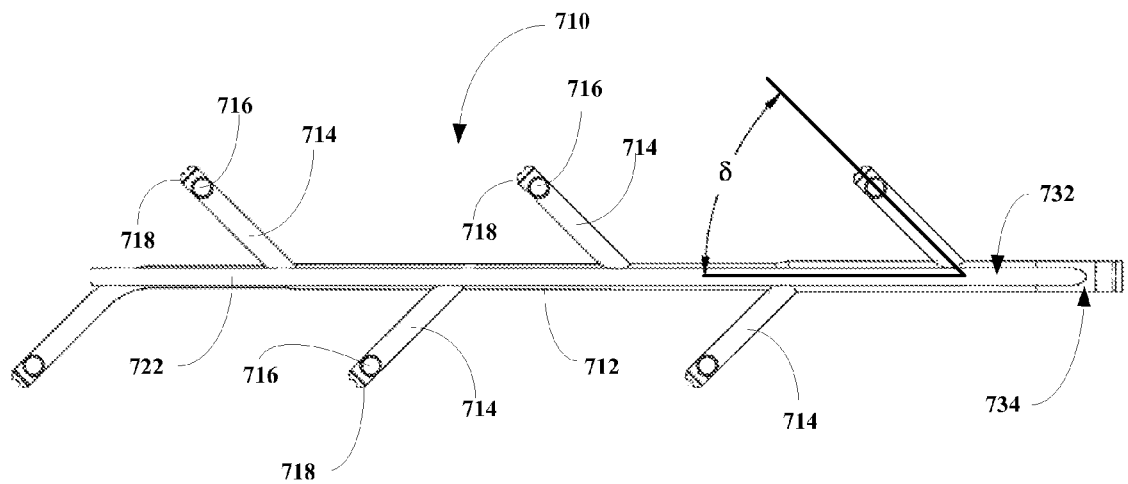
Figure 7F:
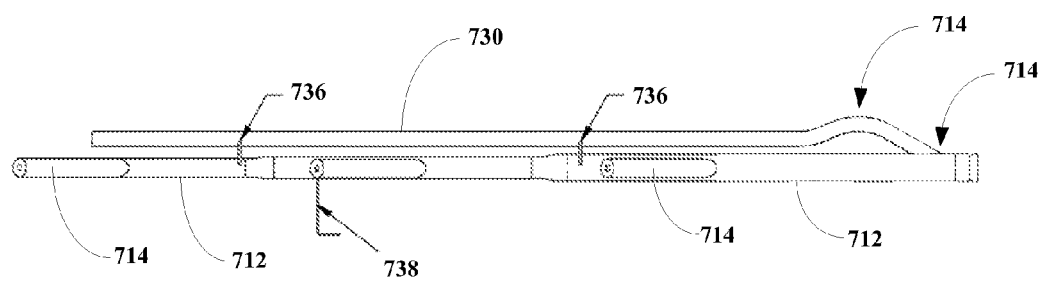
Figure 7G:
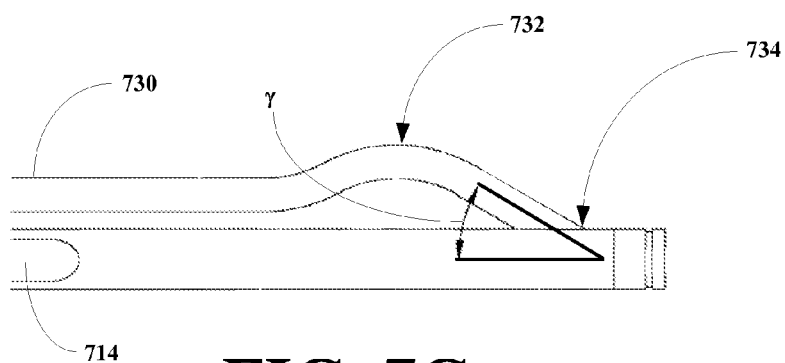
Figure 7H:
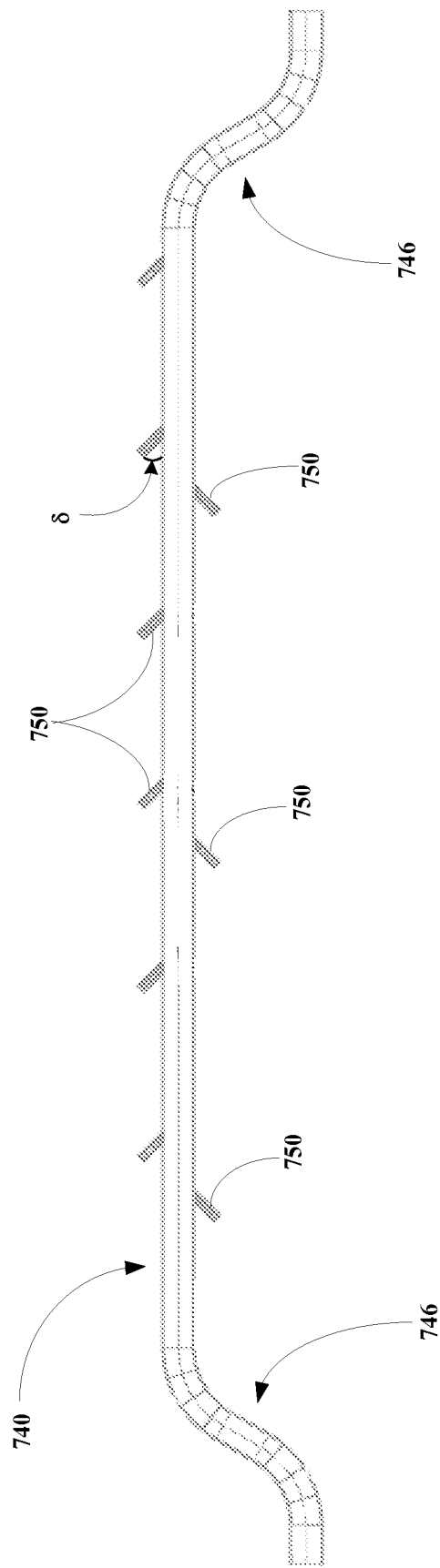
Figure 7I:
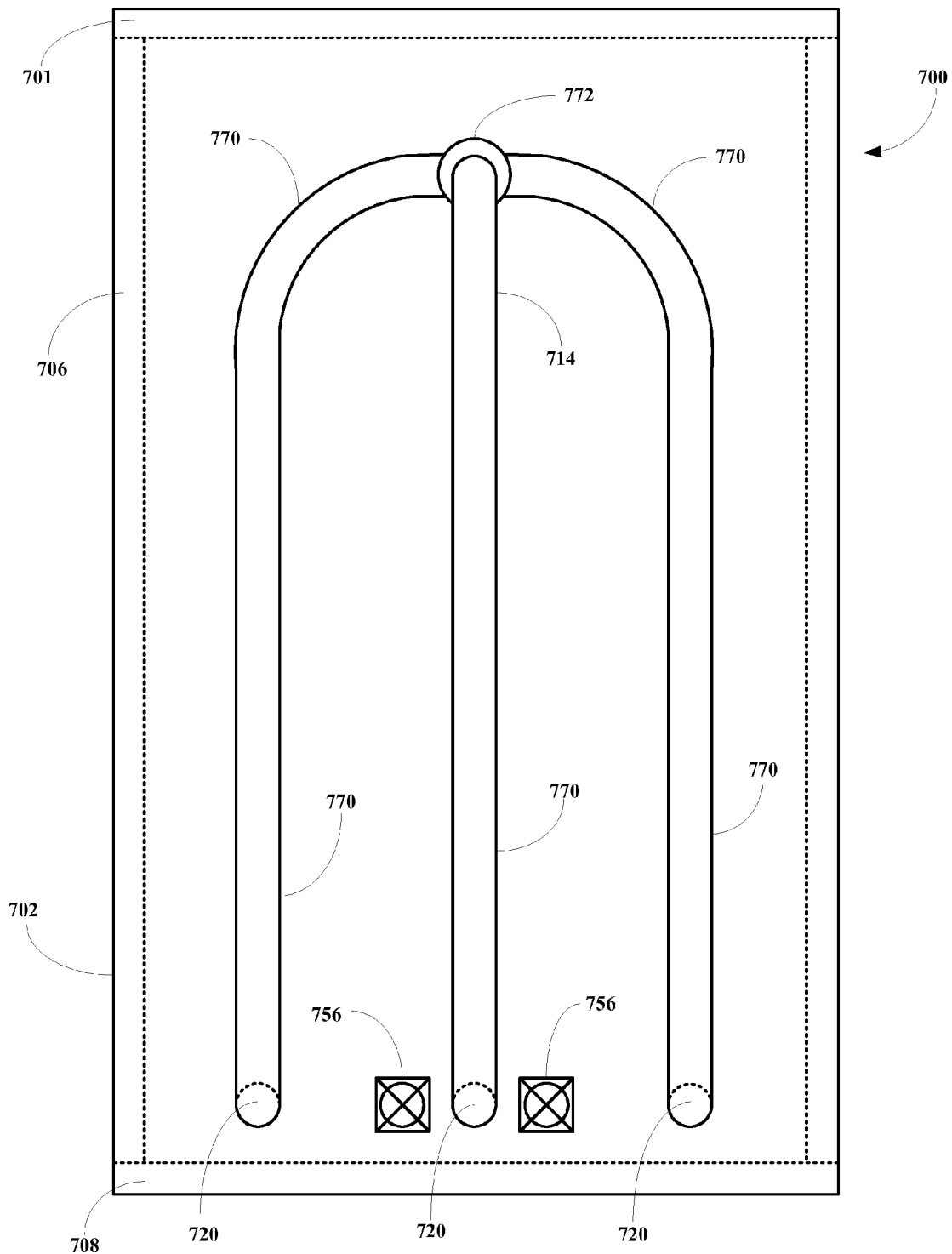

The water and nutrient supply section 610 further includes three medium uplift pumps 632a-c connected to a medium collection conduit 634a-c (see FIG. 6C) and a medium supply conduit 636a-c. The section 610 also includes a waste water and nutrient supply and recirculation pump 638a-c connected to a nitrogen rich waste water and nutrient supply conduit 640a-c and a nitrogen lean water return conduit 642a-c.

The absorber/biological denitrification section 660 include three denitrification units 662a-c and a top member 664. The conduits 634a and 636a recirculate an absorbent through the unit 662a, while conduits 640a and 642a feed nitrogen-rich waste water to and withdraw nitrogen-lean water from the unit 662a. Similarly, the conduits 634b and 636b recirculate an absorbent through the unit 662b, while conduits 640b and 642b feed nitrogen-rich waste water to and withdraw nitrogen-lean water from the unit 662b. Similarly, the conduits 634c and 636c recirculate an absorbent through the unit 662c, while conduits 640c and 642c feed nitrogen-rich waste water to and withdraw nitrogen-lean water from the unit 662c.

The section 610 and 660 also include inner walls 666, outer walls 668 and top walls 670. The denitrification units also include outer walls 672 and a top wall 673. The subsystem 600 also includes a bottom wall 674.

Figure 3B:
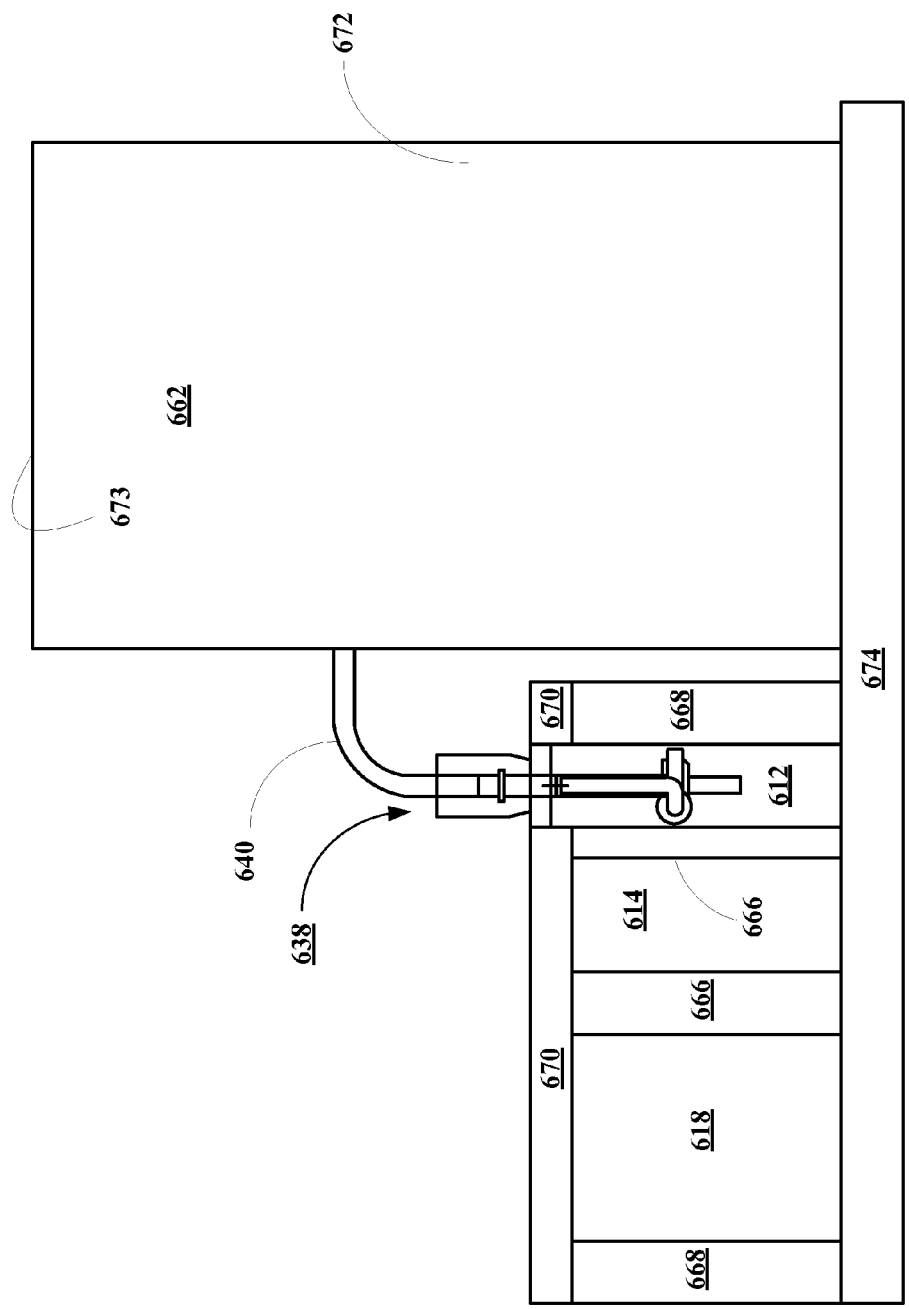
Figure 3C:
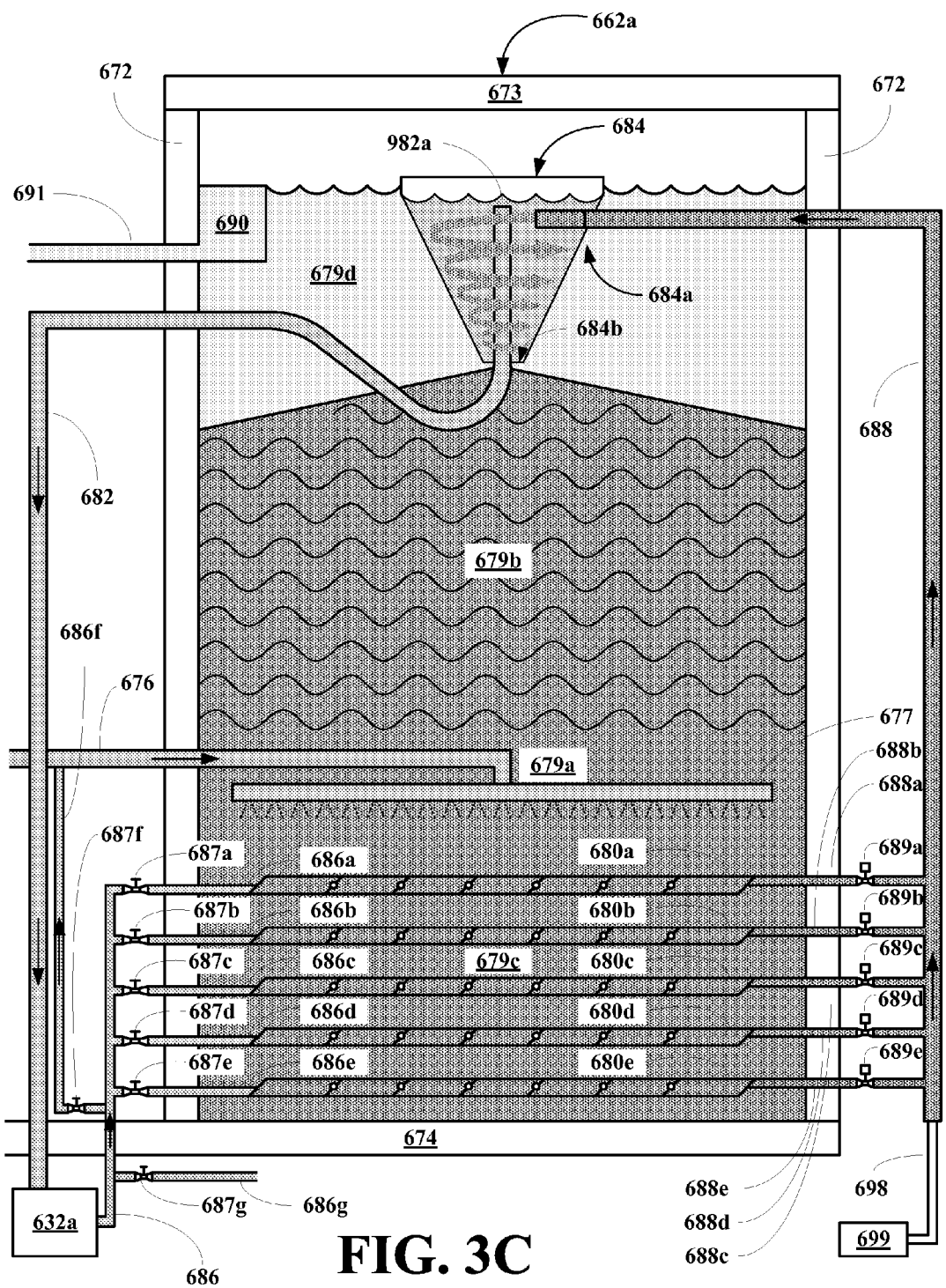
Figure 4:
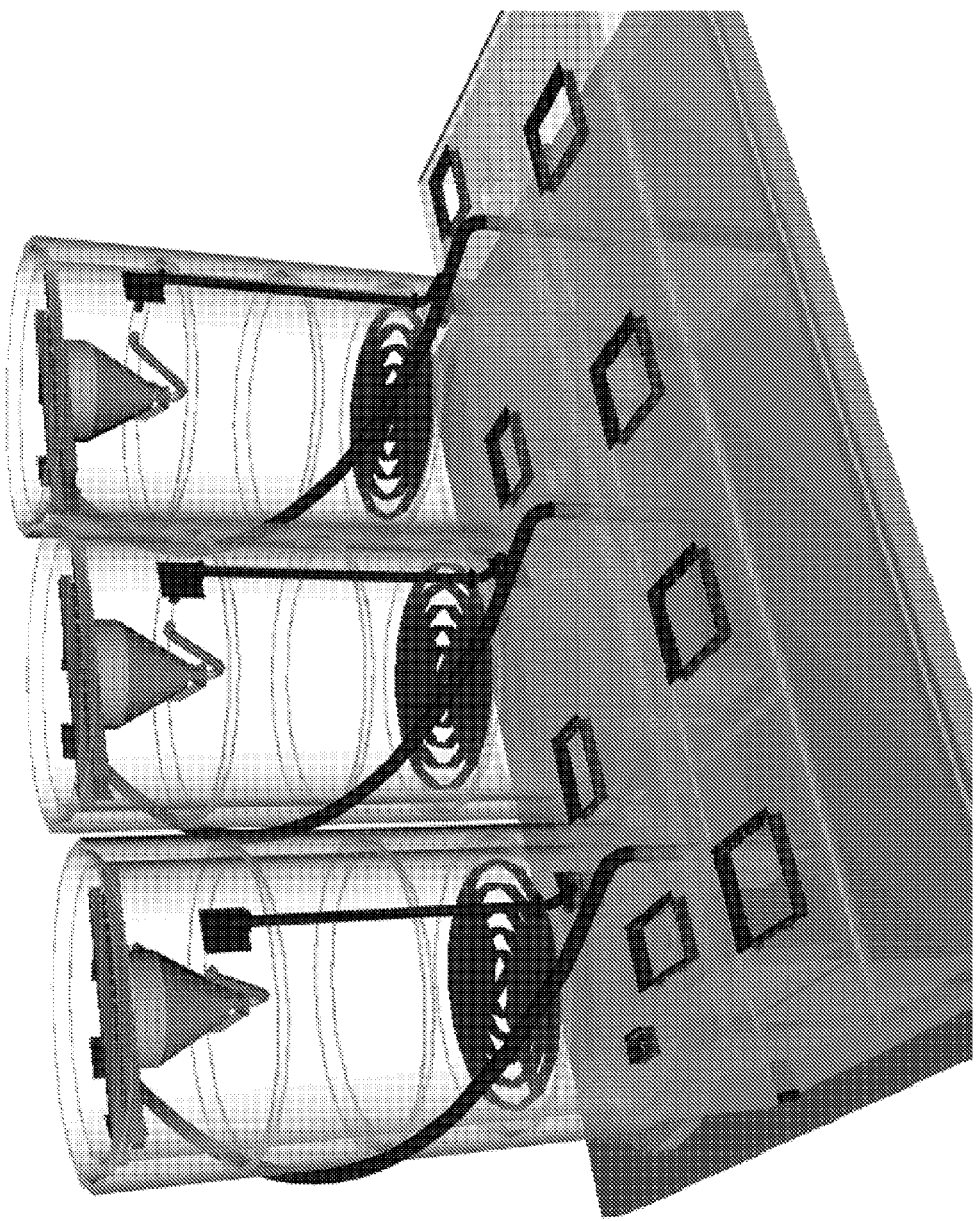
FIGS. 4-6 depict 3D renderings of the system of FIGS. 3A-C.
Figure 5:
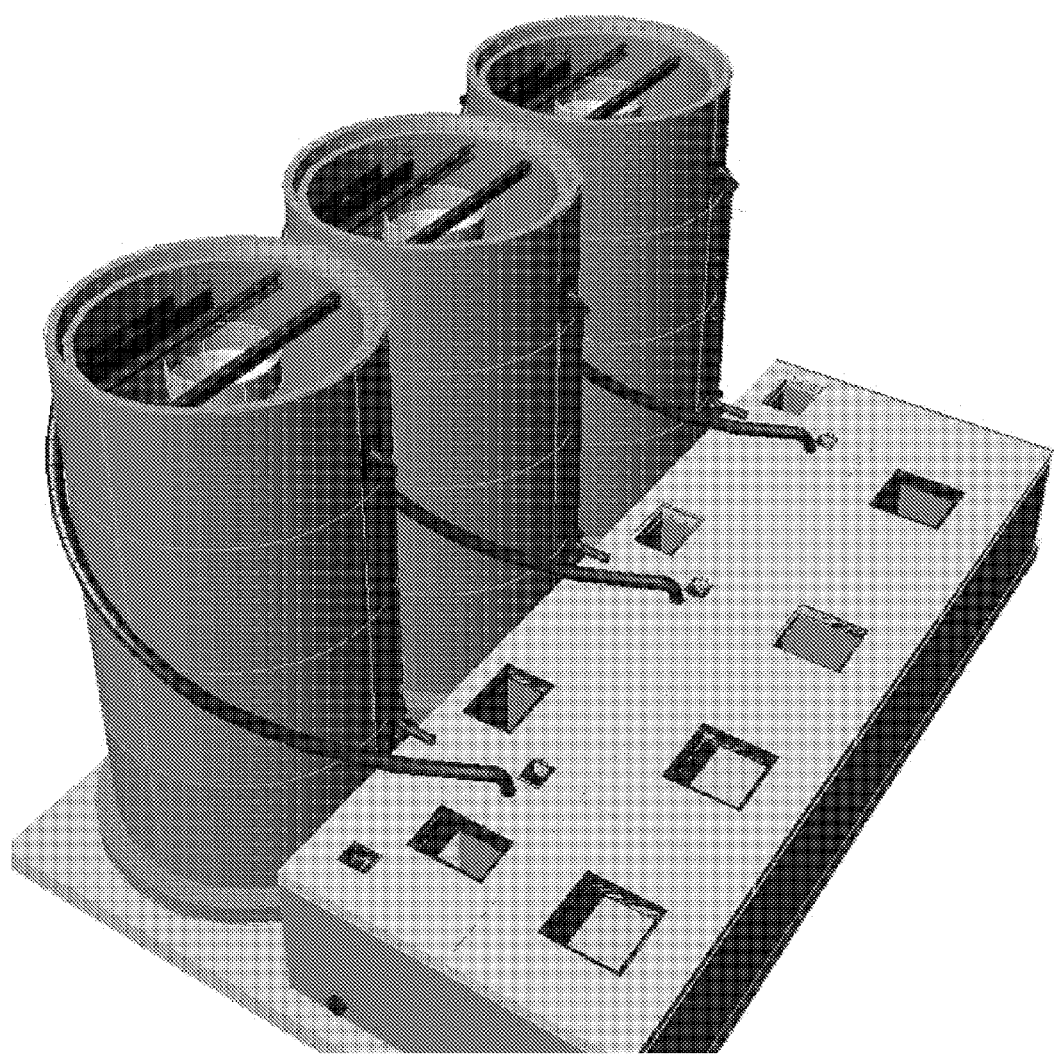

Referring now to FIG. 3C, the operation of the units 662a-c are described in conjunction with the details of the structure of the units 662a-d. Nitrogen rich waste water from the AR subsystem enters into the safe path 612 of the denitrification subsystem 600, the nitrogen-rich waste water is removed from the safe path 612 and pumped into the units 662a-c by the pump 638a-c, respectively. For the unit 662a (true for the other two), the nitrogen-rich, nutrient rich waste water is pumped through a nitrogen-rich waste water conduit 676 into a distributing header unit 677, where the nitrogen-rich waste water is introduced into a first absorption/denitrification zone or region 679a comprising a first absorbent/water/microbe mixture. In this zone, nitrogen species are absorbed into or onto the absorbent or absorbing media indicated by the dots. Depending on the oxygen content of the water entering the header 677, the zone 679a may be an aerobic zone, where aerobic microorganisms reduce the DO value to a value below about 0.04; otherwise, the zone 679a is an anoxic zone, but with evenly or uniformly distributed nutrients from the header 684. If the zone 679*a* is an anoxic zone, then nitrates/nitrites are actively converted to nitrogen gas by the action of microorganisms in the fluid inside the unit 662*a*. The distributing header unit 677 is designed to introduce the nitrogen-rich, nutrient-rich waste water into the zone 679*a* in an even or substantially even or uniform or substantially uniform distribution. This even or substantially even distribution or a uniform or substantially uniform distribution is achieved through a pattern of holes and shape of the distributor 677 so that a flow through each hole is substantially identical. This even or uniform distribution insures that nutrients for the microbes are evenly or uniformly distributed to reduce hot spots, dead spots or channeling of the water upward through the down flowing media. The nitrogen-rich, nutrient-rich waste water flows up as nitrates/nitrites are being absorbed and degraded to denitrify the water, while the media flows down so that the water and media form a counter-flow system.

As the media flow down past the header 677, the media enters a third zone 679*c*. The zone 679*c* is the respiratory inhibited zone, where microbial activity is substantially arrested. In this zone 679*c*, the media is collected and recirculated through a plurality of media collectors or inducers 680*a-e*, here five inducers are shown. In certain embodiments, the collectors or inducers 680*a-e* have different opening sizes, while in other embodiments, the collectors or inducers 680*a-e* have the same opening sizes. In the collectors or inducers 680*a-e*, the collected media is mixed with a recirculating flow of waste water, which enters the pump 632*a* via a recirculating conduit 682 having its end 682*a* centered in an ultra low pressure drop three phase separating hydrocyclone 684. The pump 632*a* pumps the recirculating flow into a recirculation exit conduit 686. The exit conduit 686 is divided into five inducer inlet conduits 686*a-e*, a shunt conduit 686*f* and a rejection conduit 686*g*. Fluid flows through the inducer inlet conduits 686*a-e*, the shut conduit 686*f* and the rejection conduit 686*g* are controlled by valves 687*a-g*. The recirculating fluid flowing through the inducers 680*a-e*, sweeps the collected media out of the inducers 680*a-e* and into outlet conduits 688*a-e*, which are combined into a medium return conduit 688. Fluid flow through the outlet conduits 688*a-e* is controlled by valves 689*a-e*. The flow rate of fluid through the inducers 680*a-c* is sufficient to dislodge dead microbes and weakly bound microbial films disposed on the surface of the media, but insufficient to reduce the particle size of the friable media to minimal extent. The conduit 688 can optionally include an aeration conduit 698 connected to an aeration unit 699. The rejection stream flowing through the conduit 686*g* is forwarded to a caustic lysing process, in this case to the precipitation subsystem 302.

The conduit 688 terminates in an upper part 684*a* of the hydrocyclone 684. In the hydrocyclone 684, the media stream mixes with clean water from a clean water zone 679*d* as the action of the hydrocyclone 684 separates the media from the water and the dead and weakly bound microbes and microbial films. The recirculating media then flows out of the hydrocyclone 684 through an hydrocyclone exit 684*b*, where the media is distributed in a second and an anoxic zone or region 679*b*, comprising a second absorbent/water/microbe mixture, where nitrogen species are absorbed into or onto the absorbent or absorbing media indicated by the dots and the nitrogen species are converted to nitrogen gas by the action of microorganisms in the water in this zone 679*b*. Nitrogen-lean water accumulates in the fourth zone 679*d*. Cleaned water is withdrawn from the unit 662*a* in the nitrogen-lean region 679*d* through an exit trough 690 connected to a nitrogen-lean water exit conduit 691. The two absorbing and denitrification regions 679*a-b* are designed to absorb and to convert nitrogen species into nitrogen gas. The resulting nitrogen-lean water exiting through the conduit 691 contains nitrogen concentration less than or equal to ($\leqq$) about 20 ppm. In certain embodiments, the nitrogen concentration is less than or equal to ($\leqq$) about 15 ppm. In certain embodiments, the nitrogen concentration is less than or equal to ($\leqq$) about 10 ppm. In other embodiments, the nitrogen concentration is less than or equal to ($\leqq$) about 5 ppm. In certain embodiments, the nitrogen concentration is less than or equal to ($\leqq$) about 4 ppm. In certain embodiments, the nitrogen concentration is less than or equal to ($\leqq$) about 3 ppm. In certain embodiments, the nitrogen concentration is less than or equal to ($\leqq$) about 2 ppm. In certain embodiments, the nitrogen concentration is less than or equal to ($\leqq$) about 1 ppm. In certain embodiments, the nitrogen concentration is less than or equal to ($\leqq$) about 0.5 ppm. In certain embodiments, the nitrogen concentration is less than or equal to ($\leqq$) about 0.4 ppm. In certain embodiments, the nitrogen concentration is less than or equal to ($\leqq$) about 0.1 ppm.

Referring now to FIGS. 4-6, 3D rendering of the denitrification subsystem of FIG. 3A-C are shown.

Fourth Embodiment

Referring now to FIGS. 7A-I, an embodiment of the media collection and lift subsystem, generally 700, is shown to include three media lift headers 710, two inducer feed headers 740 and eighteen conduits 760 mounted in a third zone 702 of a denitrification unit 704. Each media lift header 710 includes a straight stem 712 including six branches 714 distributed in a spaced apart and side to side configuration down a length of the stem 712. Each branch 714 includes a funneled shaped aperture 716 and an inducer 718. Each media lift header 710 includes an output manifold 720. Each media lift header 710 also includes a flush line 722 having an input manifold 724. The flush line 722 includes an S-bend 726 at a first location 728 near the input manifold 716 so that a straight segment 730 of the flush line 722 is disposed above the stem 712. The flush line 722 include a second bend 732 at a second location 734 near the output manifold 720, which angles upward and then downward until it ties into the stem 712 at the second location 734 near the output manifold 720. The second bend 732 is angled downward by an angle $\gamma$ as set forth above. The branches 714 are angled with respect to the stem 712 by the angle $\delta$ as set forth above. The straight segment 730 of the flush line 722 held in place by standoffs 736. The media lift headers 710 are held in place by brackets 738.

Each inducer feed header 740 includes an input manifold 742, an output manifold 744, two S-bends 746 and a straight segment 748 including nine nozzles 750 distributed in a spaced apart and side to side configuration down a length of the straight segment 748, with six nozzles on one side and three nozzles on the side. Each nozzle 750 extending out from the header 740 at the angle $\delta$. The S-bends 746 occur at a first location 752 after the input manifold 742 and a second location 754 before the output manifold 744, where the S-bends 746 position the straight segment 748 between the lift headers 710 and below the lift headers 710 so that the conduits 760 extend up to the inducers 718 of the lift headers 710.

The conduits 760 connect the nozzles 750 of the feed header 740 to the inducers 710.

The manifolds 720, 724, 742 and 744 extend through an outer wall 706 of the unit 704 at a distance d about a bottom 708 of the unit 704. The feed header output manifolds 744 are equipped with valves 756 as are the input manifolds 720, 724 and 742 (not shown). The output manifolds 720 of the media lift headers 710 are connected to lift lines 770. The lift line 770 connect to a main line 772. The main line 772 feeds the hydrocyclone as previously described in the other embodiments. As is true in the embodiment of FIG. 6C, the embodiment of FIGS. 7A-I is capable of the same levels of reduction of nitrogen contaminants as if the case of the embodiment of FIG. 6C. The main difference between the embodiment of FIG. 6C is the medium collection subsystem in the lower zone of the denitrification units. The collection subsystem of FIG. 7A-I differs from the collection system of FIG. 6C in all of the collections openings are disposed in the same or substantially the same plane, while the collection system of FIG. 6C is a staged collections subsystem with collection openings disposed in stages down the length of the RIZ zone.

Safe Path Description and Operation

The safe path of the present invention is primarily incorporated to overcome the reduced efficiencies of the traditional continuous stirred tank reactor (CSTR) designs and the lack of turndown capability in the plug flow reactor (PFR) designs. Using reactor terminology, the safe path is a mixed feed attached reactor. The reduced efficiency arises from a lack of turndown capability in a plug flow reactor (PFR) model. Using reactor terminology, the safe path is a mixed feed with attached reactors.

Figure 8A:
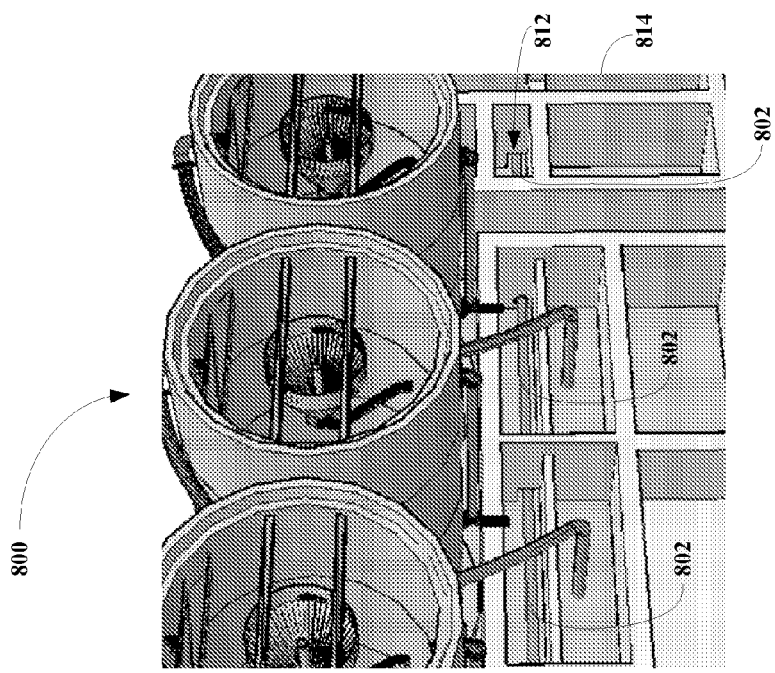
FIG. 8A depicts a 3D rendering of the system of FIG. 3A illustrating the safe path feature of the invention.

Referring now to FIG. 8A, an embodiment of the system of this invention, generally 800, is shown to include a safe path 802. When all unit operations are off, the influent flows through the safe path 808 continuously from the influent to the effluent of the system 800 as shown in FIG. 8.

As shown in FIG. 8, influent flows into the system 800 through an opening 812 in the stage wall 814. The momentum of the influent flow carries it into an apparatus 816 called a momentum block shown in FIGS. 8B-E. If the system 800 is off, pressure will increase in the momentum block 816 forcing the influent to swirl out of the momentum block 816, flow around it and pass through the system 800.

If the system 800 is on, a recirculation pump 818 draws from the momentum block 816. If the recirculation pump 818 flow is greater than the incoming influent flow, the pressure inside the momentum block 816 will lower causing water already in the stage to flow back into a space 820 between the influent wall 822 and the momentum block 816, supplementing flow to the recirculation pump 818. This mixed flow is described schematically below to illustrate the calculations.

The momentum block 816. It is shaped for efficient flow, but when placed against the safe path wall is essentially a 3 sided box 824 with a hole 826 in its top 828. The hole 826 is designed to accept a pump suction tailpipe 830 in such a fashion as to allow top pull out maintenance and reassembly without being able to see the momentum block 816 as shown in FIG. 8B. FIG. 8C shows the safe path opening 832 before placement of the momentum block 816. FIG. 8D shows the momentum block 816 with a separation 834, in certain embodiments, the separation 834 is about 4½ inch, from the safe path wall 836 containing the safe path opening 832. FIG. 8E shows a fully assembled reactor feed pump assembly 838.

In the safe path configuration of this invention, all liquid entering the tank after the momentum block 816 is from an attached reactor, in this case a denitrification unit discharge. In the denitrification stage 806, because all safe path discharges are from the denitrification units in this area of the safe path, the safe path may be described as a plug flow tank; therefore, discharge may be mathematically modeled as a PFR. The reactor treats a diluted feed like a CSTR model, except that the dilution is controlled because the reactor, the denitrification units, act as attached reactors to the safe path. In the safe path model, the size or volume of the tank (safe path sump) has no relationship to system performance in any steady-state calculation.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. An apparatus for treating waste water comprising:
at least one bio-denitrification unit, where a particulate adsorbent/absorbent is circulated through the unit in a bacteria supporting medium, the absorbent is adapted to adsorb and/or absorb nitrogen-containing compounds in a waste water stream, while the bacteria in the supporting medium convert the nitrogen-containing compounds in interstitial water and the absorbed and/or adsorbed nitrogen-containing compounds in or on the particulate adsorbent/absorbent into nitrogen gas or into amino acids via bio-synthesis,
where the units are arranged in a series configuration, the apparatus is capable of reducing a nitrogen level in a waste water at or below 10 ppm or to levels below applicable water discharge nitrogen levels and
where the aqueous solution inlet comprises a distributor adapted to produce a uniform or substantially uniform distribution of the aqueous solution across a cross-section of the unit in a lower middle section of the unit to improve nutrient utilization and reduce hot spots and channeling.

2. The apparatus of claim 1, further comprising:
a plurality of bio-denitrification units arranged in a series configuration, where the first unit treats the waste water stream and each downstream unit treats an effluent of its immediate upstream unit.

3. The apparatus of claim 1, wherein the units include:
an aqueous solution inlet comprising nitrogen-containing compounds, nutrients including a carbon food source and micro-nutrients, and a waste water,
a purified water outlet comprising water having a nitrogen level of no more than 10 ppm,
an ultra low pressure drop hydrocyclone for introducing a recirculating slurry including a particulate adsorbent/absorbent, where the hydrocyclone includes a slurry inlet disposed near a top of the hydrocyclone, a recirculating water outlet disposed centrally near the top of the hydrocyclone, a conical section and a slurry outlet disposed at a bottom of the hydrocyclone, at least one slurry collection and uplift assembly establishing a slurry recirculation loop, where the assembly includes at least one collector having a plurality of collection apertures and associated inducer apertures, a pump and an uplift conduit connected to the hydrocyclone slurry inlet and where the slurry includes a particulate adsorbent/absorbent and a fixed bio-film surrounding the particulate adsorbent/absorbent, where the biofilm includes active microbes,
a recirculating water loop comprising a recirculating conduit extending from the recirculating water outlet through a center of the slurry outlet of the hydrocyclone to a pumping unit and inducer conduits connected to the inducer apertures of the slurry collectors supplying recirculation water to the collector to induce flow of the slurry into the uplift conduit.

4. The apparatus of claim 1, wherein the purified waste water has a nitrogen content of no more the 5 ppm.

5. The apparatus of claim 1, wherein the purified waste water has a nitrogen content of no more the 3 ppm.

6. The apparatus of claim 1, wherein the purified waste water has a nitrogen content of no more the 1 ppm.

7. The apparatus of claim 1, wherein the purified waste water has a nitrogen content of no more the 0.5 ppm.

8. The apparatus of claim 1, wherein the purified waste water has a nitrogen content of no more the 0.1 ppm.

9. A method for treating waste water comprising:
supplying a waste water to a safe path associated with a denitrification system,
withdrawing a waste water from the safe path through a momentum block disposed in the safe path;
introducing a regenerated particulate adsorbent/absorbent slurry into an upper section of a bio-denitrification unit of the denitrification system through a slurry introduction apparatus,
introducing the waste water, an amount of a microbe carbon food source and an amount microbe micro-nutrients into the bio-denitrification unit through a distributor disposed in a lower middle section of the bio-denitrification unit, where the water, food source and micro-nutrients are added at a rate sufficient to establish a counter-flow, anoxic expanded bed zone of the particulate adsorbent/absorbent between a location below the distributor and an outlet of the slurry introduction apparatus, where the waste water flows up through the zone and the particulate adsorbent/absorbent flows down through the zone, the particulate adsorbent/absorbent adsorbs and/or absorbs nitrogen-containing compounds in the waste water, the microbes degrade the nitrogen-containing compounds into nitrogen gas or amino acids via bio-synthesis, the microbes control a dissolved oxygen (DO) level in the medium and the microbes utilize any residual or formed ammonia in bio-synthesis,
regenerating the particulate adsorbent/absorbent via bio-denitrification of the adsorbed and/or absorbed nitrogen-containing compounds in the counter-flow, anoxic expanded bed zone and in a co-flow, respiratory inhibited zone disposed below the anoxic zone to form a regenerated particulate adsorbent/absorbent slurry;
collecting the regenerated particulate adsorbent/absorbent slurry through a plurality of collection apertures in a slurry collection assembly;
withdrawing a recirculation water from a recirculation water outlet disposed in an upper portion of the slurry input apparatus;
supplying a portion of the recirculation water to inducer apertures of the slurry collection assembly, where an inducer aperture is associated with each collection aperture and where the water is sufficient to induce and transport the slurry through the slurry collection assembly,
uplifting the induced, regenerated particulate adsorbent/absorbent slurry in a slurry uplift assembly, where the slurry includes a sufficient amount of viable bacteria to re-populate the bacteria to a denitrification level;
overflowing a purified waste water from an outlet trough disposed in a purified water zone of the bio-denitrification unit, where the purified waste water has a nitrogen content of no more than 10 ppm,
returning the purified waste water to the safe path, and
discharging the purified waste water from a system outlet.

10. The method of claim 9, wherein the purified waste water has a nitrogen content of no more the 5 ppm.

11. The method of claim 9, wherein the purified waste water has a nitrogen content of no more the 3 ppm.

12. The method of claim 9, wherein the purified waste water has a nitrogen content of no more the 1 ppm.

13. The method of claim 9, wherein the purified waste water has a nitrogen content of no more the 0.5 ppm.

14. The method of claim 9, wherein the purified waste water has a nitrogen content of no more the 0.1 ppm.

15. The method of claim 9, further comprising:
measuring a first dissolved oxygen level at the distributor,
measuring a second dissolved oxygen level at the slurry collection assembly, and
controlling the food source and micro-nutrients based on values of the first and second dissolved oxygen levels.

16. The method of claim 15, wherein if the first dissolved oxygen level is above 0.19, increasing the carbon food source and micro-nutrients introduced with the second treated waste water and if the second dissolved oxygen level is below about 0.12 reducing carbon food source and micro-nutrients introduced with the second treated waste water.

17. A system for treating waste water comprising:
at least one denitrification unit including:
an aqueous solution inlet apparatus comprising nitrogen-containing compounds, nutrients including a carbon food source and micro-nutrients, microbes, and a waste water,
a purified water outlet comprising water having a nitrogen level of no more the 10 ppm,
an ultra low pressure drop hydrocyclone for introducing a recirculating slurry including a particulate adsorbent/absorbent, where the hydro cyclone includes a slurry inlet disposed near a top of the hydrocyclone, a recirculation water outlet disposed centrally near the top of the hydrocyclone, a conical section and a slurry outlet disposed at a bottom of the hydrocyclone, with the recirculating water outlet extending up through a middle of the slurry outlet,
an anoxic zone extending from a location just below the inlet apparatus to the slurry outlet of the hydrocyclone,
a gas overhead zone disposed in a top of the unit,
a clean water zone extending from a location near the slurry outlet of the hydrocyclone to the gas overhead zone,
a respiratory inhibited zone having a suboxic zone extending below the anoxic zone,
a water recirculation loop including a recirculation conduit connected to the recirculation water outlet and extending through a center of the slurry outlet of the hydrocyclone, and
a particulate adsorbent/absorbent slurry recirculation loop including at least one slurry collection assembly and an uplift assembly, where the slurry collection assembly includes a plurality of slurry collection apertures and recirculation water inducer apertures, where the slurry is collected in the collection apertures and are mixed with inducer recirculation water through the inducers and forwarded through the collection assembly to the uplift assembly, where the slurry in uplifted to the slurry inlet of the hydrocyclone.

18. The system of claim 17, wherein the denitrification units further include:
an aerobic zone surrounding the aqueous solution inlet.

19. The system of claim 17, wherein the aqueous solution inlet apparatus comprises a distributor adapted to produce a uniform or substantially uniform distribution of the aqueous solution across a cross-section of the unit in a lower middle section of the unit to improve nutrient utilization and reduce hot spots and channeling.

20. The system of claim 17, wherein the anoxic zone comprises a counterflow region with waste water flowing up as it is being denitrified and the particulate adsorbent/absorbent flowing down.

21. The system of claim 17, wherein a flow rate of the recirculation water entering the inducer apertures is controlled to achieve cleaning of the particulate adsorbent/absorbent, while minimizing particle size reduction of the particulate adsorbent/absorbent.

22. The system of claim 17, wherein the recirculation water entering the inducer apertures is sufficient to dislodge dead microbes and weakly bound microbial films from the particulate adsorbent/absorbent, but insufficient to reduce a particle size of the particulate adsorbent/absorbent.

23. The system of claim 17, wherein the waste water includes an unacceptable concentration of total nitrogen.

24. The system of claim 17, wherein the absorbent adsorbs and/or absorbs nitrates and/or nitrites in the aqueous solution form the waste water, while microbes in the aqueous solution convert the nitrates and/or nitrites into nitrogen gas in some or all of the zones, while ammonia and other nitrogen-containing compounds are consumed by the microbes.

* * * * *